(12) United States Patent
Takahashi et al.

(10) Patent No.: US 11,184,680 B2
(45) Date of Patent: *Nov. 23, 2021

(54) TRANSMISSION APPARATUS, TRANSMISSION METHOD, RECEPTION APPARATUS, AND RECEPTION METHOD

(71) Applicant: SATURN LICENSING LLC, New York, NY (US)

(72) Inventors: Kazuyuki Takahashi, Chiba (JP); Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 273 days.

This patent is subject to a terminal disclaimer.

(21) Appl. No.: 15/944,587

(22) Filed: Apr. 3, 2018

(65) Prior Publication Data
US 2018/0227644 A1 Aug. 9, 2018

Related U.S. Application Data

(63) Continuation of application No. 15/301,917, filed as application No. PCT/JP2016/053138 on Feb. 3, 2016, now Pat. No. 9,986,302.

(30) Foreign Application Priority Data

Feb. 17, 2015 (JP) .................................. 2015-028295

(51) Int. Cl.
H04N 21/643 (2011.01)
H04L 29/06 (2006.01)
(Continued)

(52) U.S. Cl.
CPC ... *H04N 21/64322* (2013.01); *H04L 12/5601* (2013.01); *H04L 29/06095* (2013.01);
(Continued)

(58) Field of Classification Search
CPC ......... H04N 21/64322; H04N 21/2362; H04N 21/2381; H04N 21/236; H04N 19/30; H04L 12/5601; H04L 29/06095; H04L 29/06517
See application file for complete search history.

(56) References Cited

U.S. PATENT DOCUMENTS 6,999,432 B2   2/2006  Zhang
7,920,569 B1   4/2011  Kasturi et al.
(Continued)

FOREIGN PATENT DOCUMENTS

CN   102142923 A   8/2011
CN   104094561 A   10/2014
(Continued)

OTHER PUBLICATIONS

International Search Report dated Apr. 26, 2016, in PCT/JP2016/053138 filed Feb. 3, 2016.
(Continued)

*Primary Examiner* — Michael E Teitelbaum
(74) *Attorney, Agent, or Firm* — Oblon, McClelland, Maier & Neustadt, L.L.P.

(57) ABSTRACT

A transmission apparatus that includes circuitry configured to generate transport protocol selection information used for selecting a transport protocol to be used in a specific service from a plurality of transport protocols conforming to a predetermined standard; and transmit, together with the transport protocol selection information, a content provided by the specific service according to the transport protocol set in the transport protocol selection information, and the plurality of transport protocols include at least ROUTE (Real-Time Object Delivery over Unidirectional Transport) and MMT (MPEG Media Transport).

25 Claims, 23 Drawing Sheets

(51) Int. Cl.
  *H04N 21/647* (2011.01)
  *H04N 19/30* (2014.01)
  *H04L 12/54* (2013.01)
  *H04N 21/2362* (2011.01)
  *H04N 21/2381* (2011.01)
  *H04N 21/236* (2011.01)

(52) U.S. Cl.
  CPC .... *H04L 29/06517* (2013.01); *H04L 65/4076* (2013.01); *H04L 65/601* (2013.01); *H04L 65/607* (2013.01); *H04L 65/608* (2013.01); *H04L 69/16* (2013.01); *H04L 69/169* (2013.01); *H04N 19/30* (2014.11); *H04N 21/2362* (2013.01); *H04N 21/2381* (2013.01); *H04N 21/64707* (2013.01); H04N 21/236 (2013.01)

(56) References Cited

U.S. PATENT DOCUMENTS

| | | | |
|---|---|---|---|
| 2006/0212902 A1* | 9/2006 | Seo | H04N 5/4401 725/39 |
| 2009/0296624 A1 | 12/2009 | Ryu et al. | |
| 2013/0332584 A1* | 12/2013 | Sun | H04L 61/251 709/219 |
| 2015/0229443 A1 | 8/2015 | Hwang et al. | |

FOREIGN PATENT DOCUMENTS

| | | |
|---|---|---|
| EP | 2 362 650 A1 | 8/2011 |
| JP | 2004-153777 A | 5/2004 |
| WO | WO 2014/196336 A1 | 12/2014 |

OTHER PUBLICATIONS

Arib STD-B60 1.1, Arib Standard, "MMT-Based Media Transport Scheme in Digital Brodcasting Systems", (Dec. 16, 2014), 203 pages.

Charles Lo, Qualcomm Incorporated, Tune in to the Future, "S33-1: Delivery Protocol, Service Signaling, and Input Formatting", (May 19, 2015), [retrieved on Apr. 13, 2016], http://atsc.org/pdf/bootcamp/S33-1 ATSC Bootcamp Presentation 2015 Delivery Sync.pdf, 10 pages.

Extended European Search Report dated Jul. 27, 2018 in corresponding European Patent Application No. 16752286.1, 8 pages.

* cited by examiner

| Packet Type Value | Meaning |
|---|---|
| 000 | System A : IPv4(ROUTE) |
| 001 | System B : IPv4(MMT) |
| 010 | System C : MPEG2 TS |
| 011 | Reserved |
| 100 | System A : L2 Signaling(ROUTE) |
| 101 | System B : L2 Signaling(MMT) |
| 110 | System C : L2 Signaling(MPEG2 TS) |
| 111 | Extension |

FIG.5

| Syntax | No. of Bits | Format |
|---|---|---|
| framed_packet() { | | |
|     type | 16 | uimsbf |
|     length | 16 | '11' |
|     packet() | var | bslbf |
| } | | |

FIG.6

| Packet Type Value | Meaning |
|---|---|
| 000 | IPv4 |
| 001 | Compressed IP Packet |
| 010 | MPEG-2 Transport Stream |
| 011 | Reserved |
| 100 | L2 Signaling |
| 101 | Reserved |
| 110 | Reserved |
| 111 | Extension |

FIG.8

| service_type | Meaning |
| --- | --- |
| 0x00 | System A (ROUTE) |
| 0x01 | System B (MMT) |
| 0x02 | System C (MPEG2 TS) |
| 0x03 | System D |
| 0x04-0xff | Reserved |

| service_type | Meaning |
|---|---|
| 0x00 | System A (ROUTE) |
| 0x01 | System B (MMT) |
| 0x02 | System C (MPEG2 TS) |
| 0x03 | System D |
| 0x04-0xff | Reserved |

| Syntax | No. of bits | Mnemonic | Description |
|---|---|---|---|
| FIT{ | | | |
|   FIT_protocol_version | 8 | uimsbf | Protocol version |
|   Broadcast_stream_id | 16 | uimsbf | Broadcast Stream ID(equals to ts_id) |
|   SCD_exist_flag | 1 | bslbf | Indicates SCD is delivered in LLS |
|   Reserved | 7 | | |
|   IF(SCD_exist_flag){ | | | |
|     PLP_id | 8 | uimsbf | PLP ID which SCD is delivered |
|   } | | | |
|   num_services | 8 | uimsbf | Number of services |
|   for(i=0; i<num_services; i++){ | | | |
|     service_id | 16 | uimsbf | Service ID |
|     provider_id | 16 | uimsbf | Provider ID |
|     SLS_data_version | 8 | uimsbf | Version number of SLS |
|     service_channel_number | 16 | uimsbf | Service channel number |
|     service_category | 6 | uimsbf | Service category(e.g. A/V,audio,ESG,NRT) |
|     short_service_name_length | 3 | uimsbf | Length of short service name |
|     short_service_name | 16*m | bslbf | Short service name |
|     service_status | 3 | uimsbf | Service status(active/inactive/show/hidden) |
|     sp_indicator | 1 | bslbf | Service protection |
|     IP_version_flag | 1 | bslbf | IP packet version(IPv4/IPv6) |
|     SLS_src_IP_addr_flag | 1 | bslbf | Indicate source IP address is delivered or not |
|     capability_flag | 1 | bslbf | Indicate capability_code is exist or not |
|     reserved | 1 | '1' | |
|     service_type | 8 | bslbf | Service type(System A(ROUTE),System B(MMT), System C(MPEG2 TS) |
|     if(capability_flag){ | | | |
|       capability_code | 8 | uimsbf | pre-defined capability code |
|     } | | | |
|     if(SLS_source_IP_address_flag){ | | | |
|       SLS_src_IP_addr | 32 or 128 | uimsbf | Source IP address |
|     } | | | |
|     SLS_dst_IP_addr | 32 or 128 | uimsbf | Destination IP address |
|     SLS_dst_port | 16 | uimsbf | UDP port number |
|     SLS_TSI | 16 | uimsbf | TSI number |
|     SLS_PLP_id | 8 | uimsbf | The ID of one datapipe which carries SSC |
|     SLS_simpleservice | 1 | bslbf | Indicate broadcast service is simple or not |
|     reserved | 3 | '111' | |
|     num_service_level_descriptor | 4 | uimsbf | number of service level descriptors |
|     for(i=0;i<num_service_level_descriptor;i++){ | | | |
|       service_level_descriptor() | var | | |
|     } | | | |
|   } | | | |
|   reserved | 4 | | |
|   num_FIT_level_descriptor | 4 | | number of FIT level descriptors |
|   for(i=0; i<num_FIT_level_descriptor; i++){ | | | |
|     FIT_level_descriptor() | var | | |
|   } | | | |
| } | | | |

FIG.16

| service_type | Meaning |
|---|---|
| 0x00 | System A (ROUTE) |
| 0x01 | System B (MMT) |
| 0x02 | System C (MPEG2 TS) |
| 0x03 | System D |
| 0x04-0xff | Reserved |

FIG.17

| BBF Extension Header Index | service_type |
|---|---|

FIG.21

| service_type | Meaning |
|---|---|
| 0x00 | System A (ROUTE) |
| 0x01 | System B (MMT) |
| 0x02 | System C (MPEG2 TS) |
| 0x03 | System D |
| 0x04-0xff | Reserved |

FIG.22

TRANSMISSION APPARATUS, TRANSMISSION METHOD, RECEPTION APPARATUS, AND RECEPTION METHOD

CROSS-REFERENCE TO RELATED APPLICATIONS

This application is a continuation of U.S. Ser. No. 15/301,917, filed Oct. 4, 2016, which is a continuation of International Application No. PCT/JP2016/053138, filed on Feb. 3, 2016, which claims priority to Japanese Patent Application No. 2015-028295, filed Feb. 17, 2015. The entire contents of which are incorporated herein by reference.

TECHNICAL FIELD

The present disclosure relates to a transmission apparatus, a transmission method, a reception apparatus, and a reception method, more particularly, to a transmission apparatus, a transmission method, a reception apparatus, and a reception method that enable a plurality of transport protocols to coexist.

BACKGROUND

For example, in ATSC (Advanced Television Systems Committee) 3.0 as one of next-generation terrestrial broadcasting standards, UDP/IP, that is, IP (Internet Protocol) packets each including a UDP (User Datagram Protocol) packet are determined to be used for data transmissions. Also in other broadcasting systems excluding ATSC 3.0, IP packets are expected to be used in the future (see, for example, Non-patent Document 1).

Non-patent Document 1: "ARIB STD-B60 Version 1.1", Association of Radio Industries and Businesses

SUMMARY

Problem to be Solved by the Disclosure

Incidentally, in broadcasting systems such as ATSC 3.0, a plurality of transport protocols may coexist. Therefore, a technology that enables the plurality of transport protocols to coexist is demanded.

The present technology has been made in view of the circumstances as described above and aims at enabling a plurality of transport protocols to coexist.

Means for Solving the Problem

According to a first embodiment of the present technology, there is provided a transmission apparatus including: a generation unit that generates transport protocol selection information used for selecting a transport protocol to be used in a specific service from a plurality of transport protocols conforming to a predetermined standard; and a transmission unit that transmits, together with the transport protocol selection information, a content provided by the specific service according to the transport protocol set in the transport protocol selection information.

The transmission apparatus according to the first embodiment of the present technology may be an independent apparatus or may be an internal block constituting one apparatus. In addition, a transmission method according to the first embodiment of the present technology is a transmission method corresponding to the transmission apparatus according to the first embodiment of the present technology described above.

In the transmission apparatus and transmission method according to the first embodiment of the present technology, transport protocol selection information used for selecting a transport protocol to be used in a specific service from a plurality of transport protocols conforming to a predetermined standard is generated, and a content provided by the specific service is transmitted together with the transport protocol selection information according to the transport protocol set in the transport protocol selection information.

According to a second embodiment of the present technology, there is provided a reception apparatus including: a reception unit that receives, together with transport protocol selection information used for selecting a transport protocol to be used in a specific service from a plurality of transport protocols conforming to a predetermined standard, a content provided by the specific service that is transmitted according to the transport protocol set in the transport protocol selection information; and a processing unit that carries out processing of reproducing the content according to the transport protocol set in the transport protocol selection information.

The reception apparatus according to the second embodiment of the present technology may be an independent apparatus or may be an internal block constituting one apparatus. In addition, a reception method according to the second embodiment of the present technology is a reception method corresponding to the reception apparatus according to the second embodiment of the present technology described above.

In the reception apparatus and reception method according to the second embodiment of the present technology, together with transport protocol selection information used for selecting a transport protocol to be used in a specific service from a plurality of transport protocols conforming to a predetermined standard, a content provided by the specific service that is transmitted according to the transport protocol set in the transport protocol selection information is received, and processing of reproducing the content is carried out according to the transport protocol set in the transport protocol selection information.

Effects of the Disclosure

According to the first and second embodiments of the present technology, a plurality of transport protocols can coexist.

It should be noted that the effects described herein are not necessarily limited, and any effect described in the specification may be obtained.

BRIEF DESCRIPTION OF DRAWINGS

FIG. 5 A diagram showing an example of a packet type.

FIG. 6 A diagram showing an example of a syntax arranged in a case where a packet type value is extended.

FIG. 8 A diagram showing an example of a packet type.

FIG. 16 A diagram showing an example of a FIT syntax.

FIG. 17 A diagram showing examples of the service type.

FIG. 21 A diagram showing an example of a structure arranged in the L1 extension header.

FIG. 22 A diagram showing examples of the service type.

DETAILED DESCRIPTION

Hereinafter, an embodiment of the present technology will be described with reference to the drawings. It should be noted that the descriptions will be made in the following order.

Figure 1:
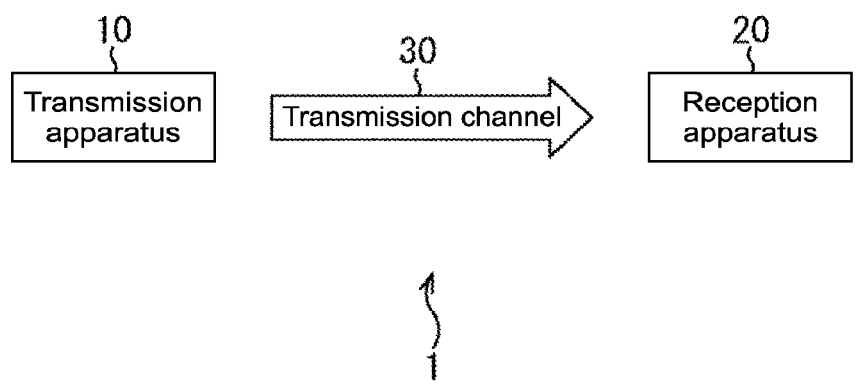
FIG. 1 A diagram showing a configuration of a transmission system to which the present technology is applied according to an embodiment.

1. System configuration
2. Frame configuration
3. Operation example
  (1) Operation example 1: Generic header transmission method
  (2) Operation example 2: Generic extension header transmission method
  (3) Operation example 3: L2 signaling header transmission method
  (4) Operation example 4: L2 signaling transmission method
  (5) Operation example 5: L1 extension header transmission method
4. Configuration of each apparatus
5. Flow of processing executed in each apparatus
6. Computer configuration 1. System Configuration FIG. 1 is a diagram showing a configuration of a transmission system to which the present technology is applied according to an embodiment. It should be noted that the system refers to a logical group of a plurality of apparatuses.

In FIG. 1, a transmission system 1 is constituted of a transmission apparatus 10 and a reception apparatus 20. In the transmission system 1, data transmissions conforming to a broadcasting system such as ATSC 3.0 are performed.

The transmission apparatus 10 transmits contents such as television programs. Specifically, the transmission apparatus 10 transmits, via a transmission channel 30, a stream of target data to be transmitted, such as video and audio (component) data of a content, as digital broadcasting signals.

The reception apparatus 20 receives the digital broadcasting signals transmitted from the transmission apparatus 10 via the transmission channel 30 and restores and outputs the original stream. For example, the reception apparatus 20 outputs video and audio data of a content such as a television program.

It should be noted that in addition to the data transmissions conforming to ATSC 3.0, the transmission system 1 of FIG. 1 is applicable to data transmissions conforming to standards of DVB (Digital Video Broadcasting), ISDB (Integrated Services Digital Broadcasting), and the like, data transmissions conforming to other ATSC standards, and other data transmissions. Moreover, in addition to terrestrial broadcasting, satellite connections, cable television networks (wired lines), and the like can be adopted as the transmission channel 30.

2. Frame Configuration (Frame Configuration)

Figure 2:
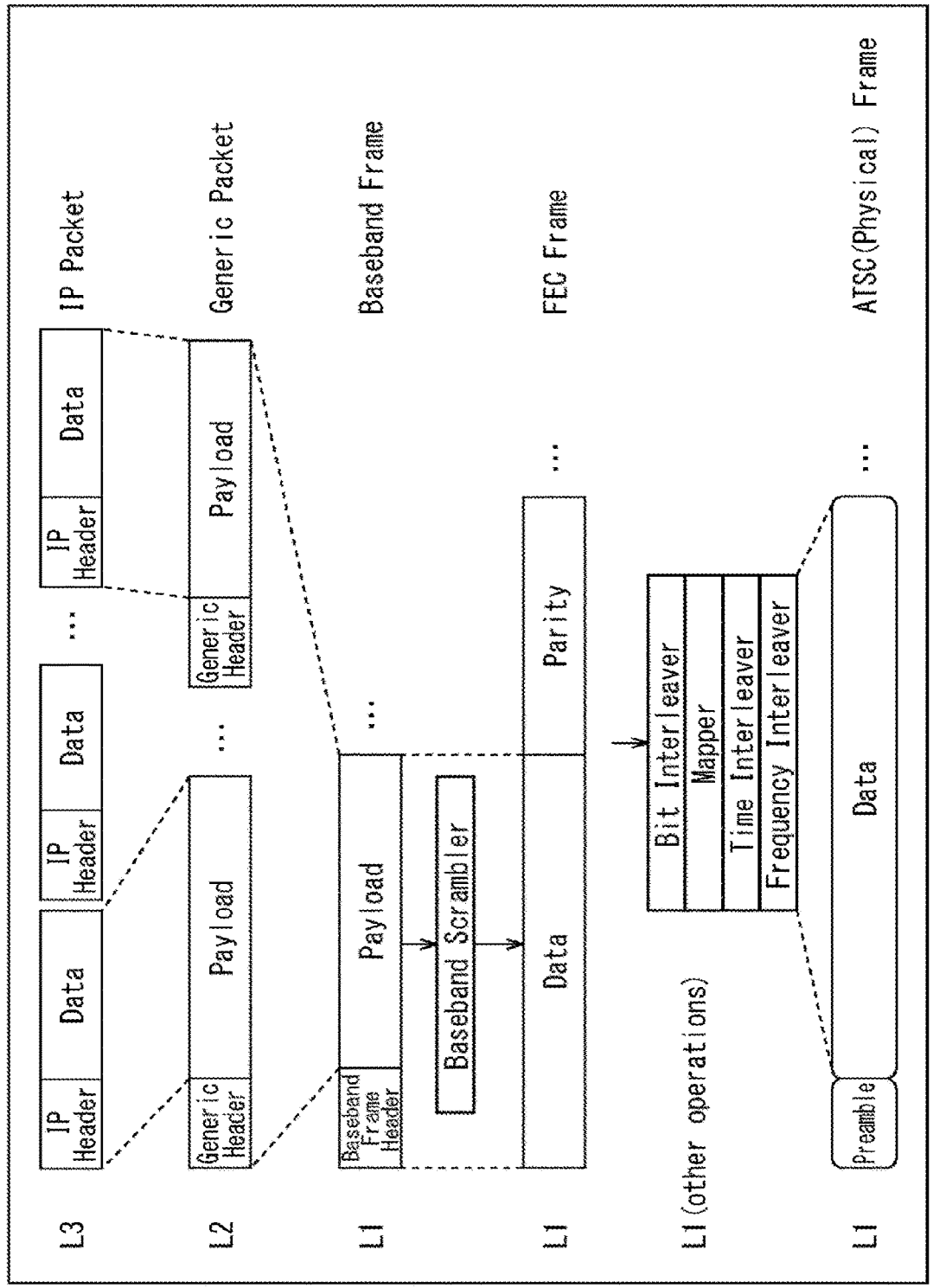
FIG. 2 A diagram showing an example of a frame configuration of each layer.

FIG. 2 is a diagram showing an example of a frame configuration of layers 1 (L1) to 3 (L3), that is transmitted in the transmission system 1 shown in FIG. 1. It should be noted that FIG. 2 assumes a case where an IP transmission method such as ATSC 3.0 is used as the broadcasting system.

As shown in FIG. 2, an IP packet (IP Packet) is transmitted in the layer 3 (L3). The IP packet is constituted of an IP header (IP Header) and data (Data). In the data of the IP packet, video and audio data, signaling information, and the like are arranged. Further, in the layer 2 (L2), a Generic packet (Generic Packet) as a transmission packet is transmitted. The Generic packet is constituted of a Generic header (Generic Header) and a payload (Payload). In the payload of the Generic packet, one or a plurality of IP packets are arranged and encapsulated (encapsulation).

A BB frame (Baseband Frame) of the layer 1 (L1) corresponding to a physical layer is constituted of a BB frame header (Baseband Frame Header) and a payload (Payload). In the payload of the BB frame, a plurality of Generic packets are arranged and encapsulated. Also in the layer 1, data (Data) obtained by scrambling a plurality of BB frames is mapped onto a FEC frame (FEC Frame), and an error correction parity (Parity) for the physical layer is added thereto.

Here, the physical layer frame (ATSC (Physical) Frame) of the layer 1 (L1) is constituted of a preamble (Preamble) and a data part (Data). Mapped onto the data part of the physical layer frame is data obtained by carrying out bit interleave on a plurality of FEC frames and carrying out mapping processing after that, and additionally carrying out processing of the physical layer, such as interleave in a time direction and a frequency direction.

3. Operation Example

Figure 3:
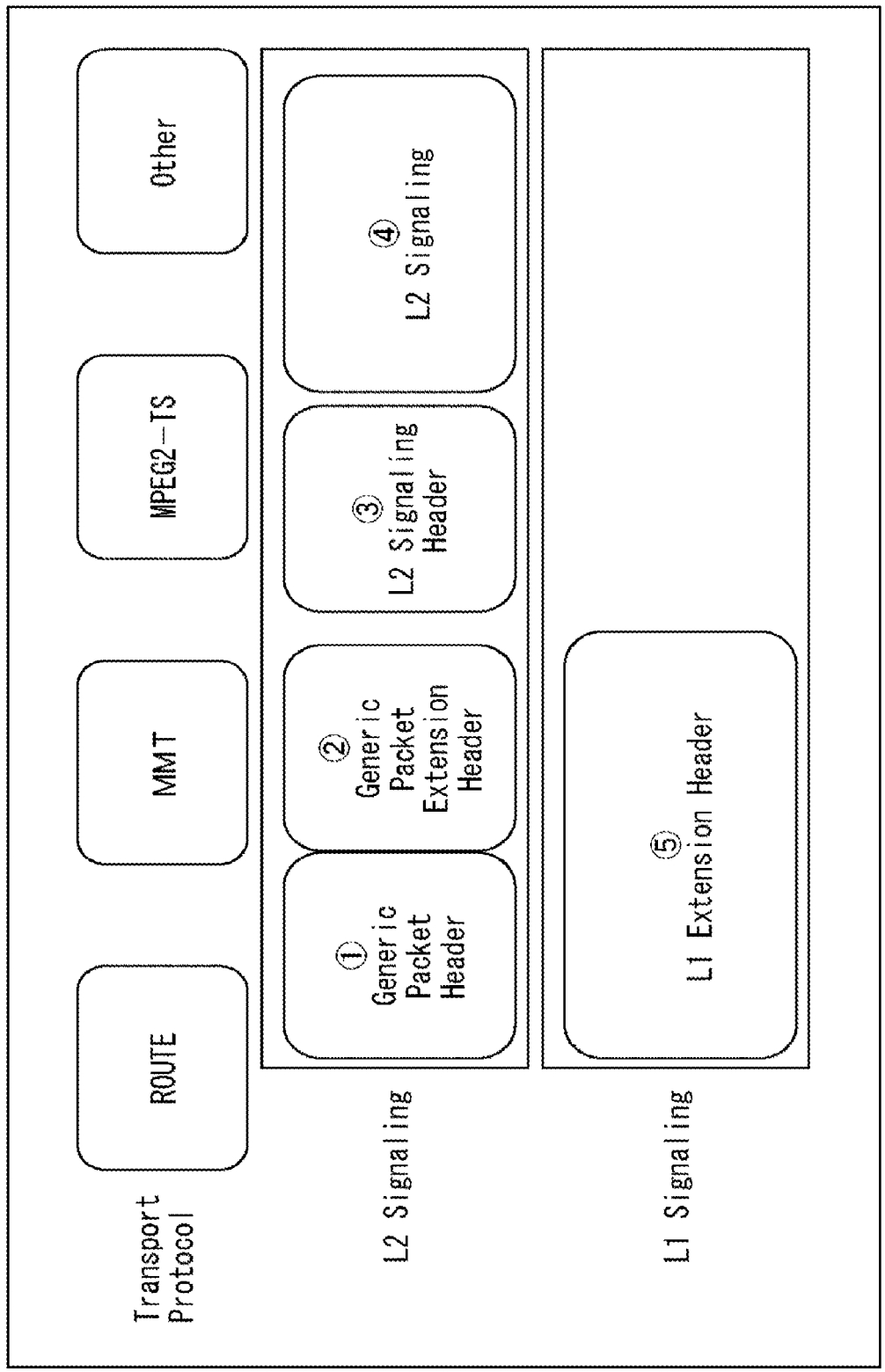
FIG. 3 A diagram for explaining a transmission method of transport protocol selection information for selecting a plurality of transport protocols.

Incidentally, as shown in FIG. 3, in the broadcasting system such as ATSC 3.0, transport protocols of ROUTE (Real-Time Object Delivery over Unidirectional Transport), MMT (MPEG Media Transport), MPEG2-TS (Transport Stream), and the like may be operated while they coexist. In ATSC 3.0, for example, ROUTE and MMT coexist.

Here, ROUTE is a protocol obtained by extending FLUTE (File Delivery over Unidirectional Transport) which is a protocol suited for unidirectionally multicast-transferring binary files. Further, MMT is a transport system used for IP (Internet Protocol). By setting an IP address or URL (Uniform Resource Locator) by control information, data of a video, audio, and the like can be referenced. MPEG2-TS is a transport system for exchanging MPEG2-format data, and data of a video, audio, and the like can be collectively handled as one stream.

These transport protocols are each constituted of a unique dataflow and service signaling. Therefore, when providing a service, a broadcast station side (transmission apparatus 10) selects and uses a specific transport protocol from the plurality of transport protocols such as ROUTE and MMT. In such a case, since necessary information differs for each transport protocol, the transmission apparatus 10 needs to transmit information for selecting (discriminating) a specific transport protocol (hereinafter, referred to as transport protocol selection information) on the reception apparatus 20 side.

In this regard, the present technology proposes 5 transmission methods, that is, a Generic header transmission method, a Generic extension header transmission method, an L2 signaling header transmission method, an L2 signaling transmission method, and an L1 extension header transmission method, as the method of transmitting transport protocol selection information.

Hereinafter, operation examples 1 to 5 will be described as specific examples of the 5 transmission methods.

(1) Operation Example 1

First, with reference to FIGS. 4 to 6, an operation example 1 that uses the Generic header transmission method will be described. In the Generic header transmission method, the transport protocol selection information is transmitted using a header of a Generic packet (Generic header).

Figure 4:
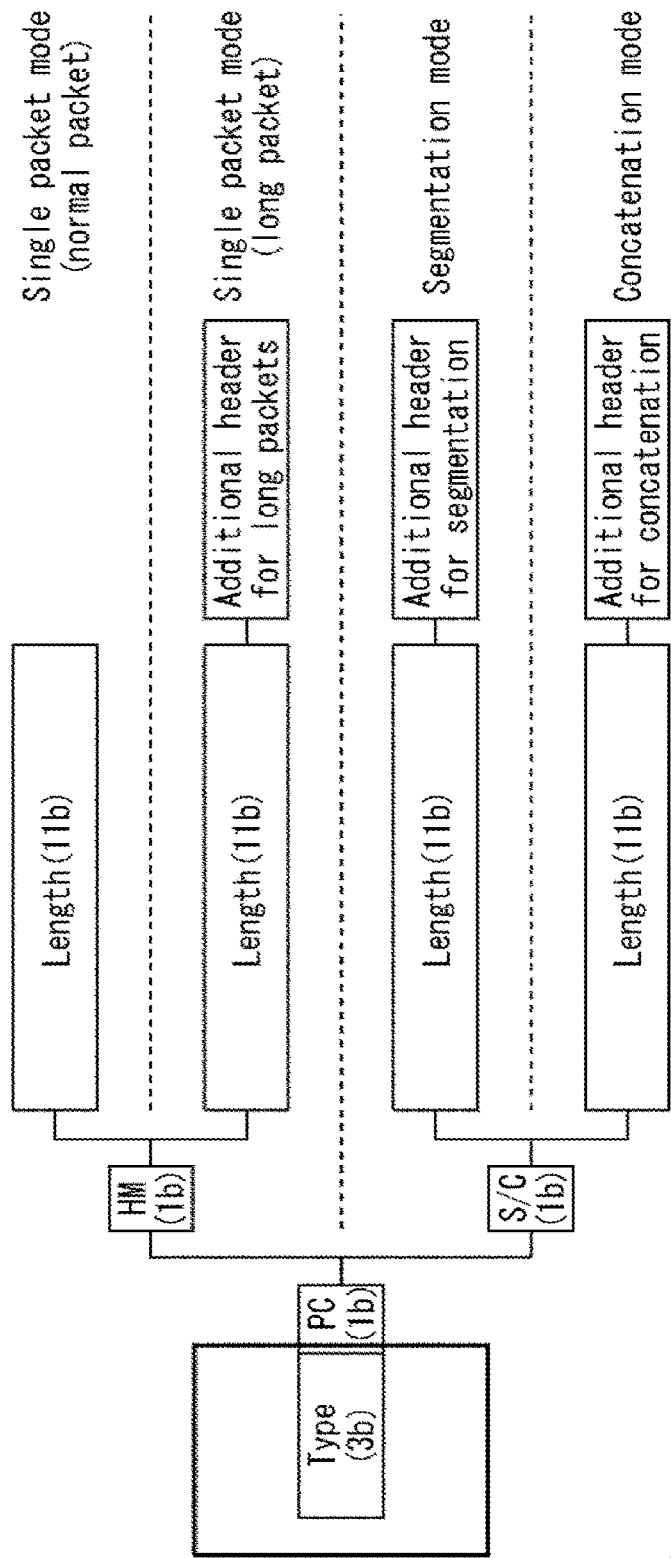
FIG. 4 A diagram showing a configuration of a Generic packet.

FIG. 4 shows a configuration of a Generic packet. In the Generic packet shown in FIG. 4, 3-bit type information (Type) is set at a head of the Generic header. As the type information, information on a type of data arranged in the payload of the Generic packet is set as shown in FIG. 5.

Specifically, defining a case where ROUTE is used as "system A (System A)", a case where MMT is used as "system B (System B)", and a case where MPEG2-TS is used as "system C (System C)" as the transport protocol, when an IP packet of IPv4 of the system A is arranged in the payload, "000" is set as the type information.

Further, when an IP packet of IPv4 of the system B is arranged in the payload, "001" is set as the type information. Furthermore, when a TS packet of the system C is arranged in the payload, "010" is set as the type information. It should be noted that the type information "011" is undefined (Reserved) in FIG. 5.

Similarly, when L2 signaling information of the system A is arranged in the payload, "100" is set as the type information. Further, when L2 signaling information of the system B is arranged in the payload, "101" is set as the type information. Furthermore, when L2 signaling information of the system C is arranged in the payload, "110" is set as the type information.

It should be noted that when an extension by the undefined (Reserved) area is insufficient, "111" is set for extending type information constituted of a predetermined area. FIG. 6 shows an example of a syntax of data arranged in a case where a packet type value is extended. Since the packet type value can be extended as described above, a case where 4 or more transport protocols coexist can also be supported.

Referring back to FIG. 4, in the Generic header, 1-bit packet setting information (PC: Packet Configuration) is arranged subsequent to the type information. When "0" is set as the packet setting information, the packet mode becomes a single packet mode (Single packet mode) according to a 1-bit header mode (HM: Header Mode) arranged subsequent to the packet setting information, and 11-bit length information (Length) and an extension header (Additional header) are arranged in the Generic header.

It should be noted that in the single packet mode, a Generic packet in which an extension header is not arranged is called normal packet, and a Generic packet in which an extension header is arranged is called long packet.

On the other hand, when "1" is set as the packet setting information (PC), the packet mode becomes a segmentation mode (Segmentation mode) or a concatenation mode (Concatenation mode) according to a 1-bit S/C (Segmentation/Concatenation) arranged subsequent to the packet setting information, and 11-bit length information (Length) and an extension header (Additional header) are arranged in the Generic header.

In the Generic packet, a payload is arranged subsequent to the Generic header configured as described above. In the payload, an IP packet of IPv4, L2 signaling information, and the like of the system A are arranged, for example, according to the type information of the Generic header.

As described above, by arranging the transport protocol selection information (type information) in the Generic header and transmitting it using the Generic header transmission method, as a transmission format for transmitting transport protocol selection information, the reception apparatus 20 can select (discriminate) a transport protocol to be used in a service to be provided from the plurality of transport protocols such as ROUTE and MMT.

(2) Operation Example 2

Next, with reference to FIGS. 7 to 11, an operation example 2 that uses the Generic extension header transmission method will be described. In the Generic extension header transmission method, the transport protocol selection information is transmitted using an extension header of a Generic packet (Generic extension header).

Figure 7:
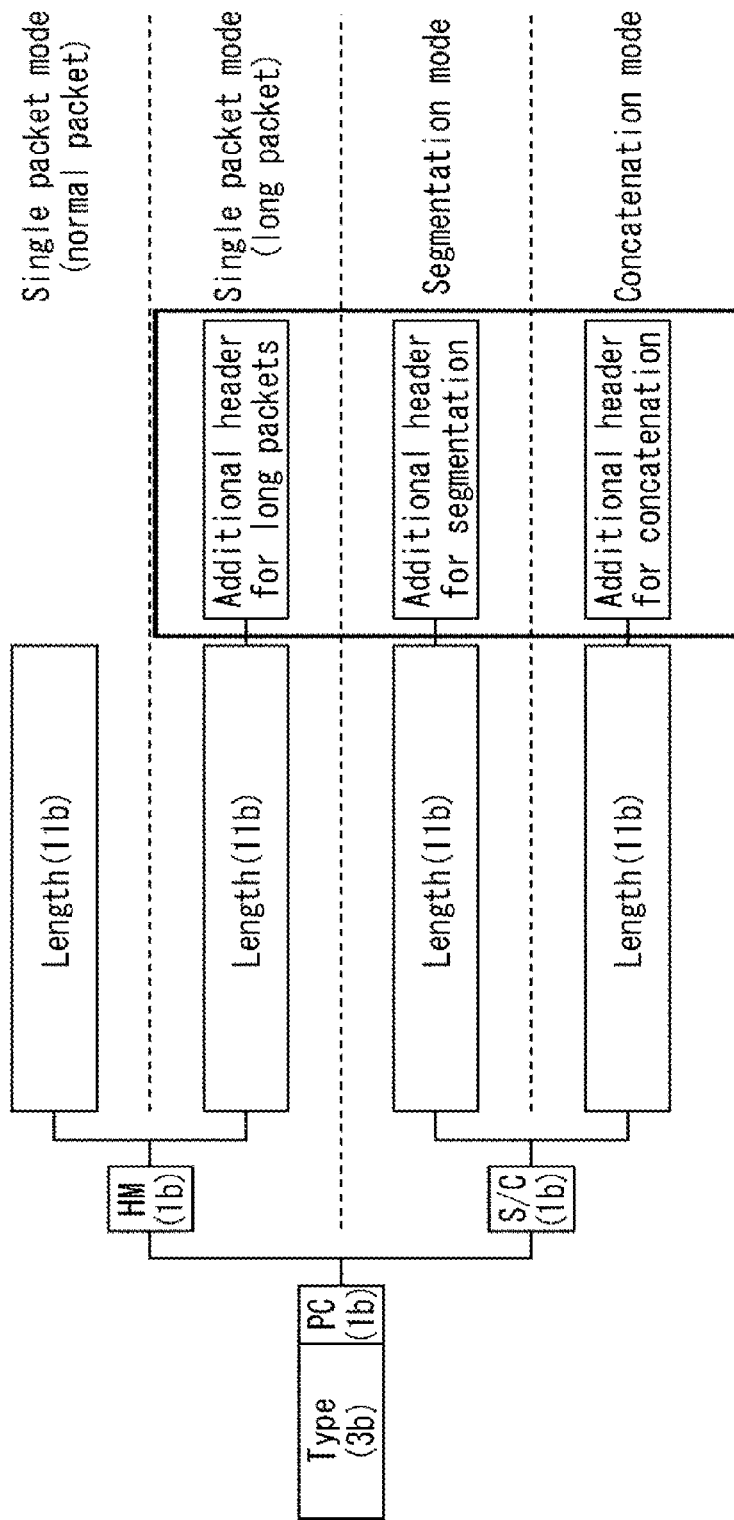
FIG. 7 A diagram showing a configuration of a Generic packet.

FIG. 7 shows a configuration of a Generic packet. In the Generic packet shown in FIG. 7, a configuration of a Generic header is similar to that of the Generic header shown in FIG. 4. Therefore, descriptions thereof will be omitted as appropriate. The transport protocol selection information is arranged in the extension header (Additional header) surrounded by a bold frame in the figure. As type information (Type) arranged at a head of the Generic header in FIG. 7, information on a type of data arranged in a payload of the Generic packet is set as shown in FIG. 8.

Specifically, when an IP packet of IPv4 is arranged in the payload, "000" is set as the type information. Further, when a compressed IP packet is arranged in the payload, "001" is set as the type information. Furthermore, when a TS packet of the MPEG2-TS method is arranged in the payload, "010" is set as the type information.

Similarly, when L2 signaling information is arranged in the payload, "100" is set as the type information. It should be noted that in FIG. 8, pieces of type information of "011", "101", and "110" are undefined (Reserved). Moreover, when an extension by these 3 undefined (Reserved) areas is insufficient, "111" is set for extending type information constituted of a predetermined area.

Figure 9:
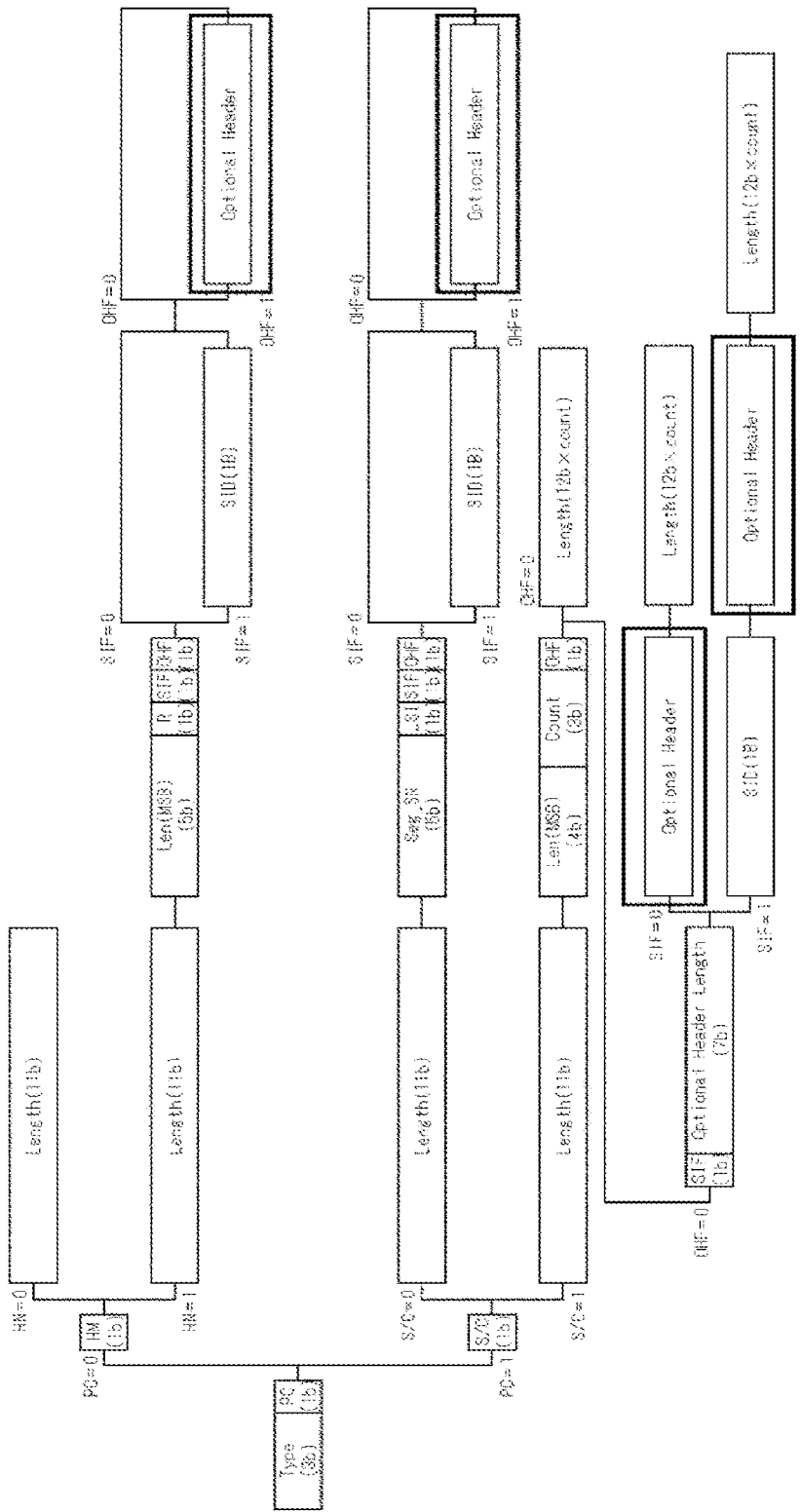
FIG. 9 A diagram showing a specific configuration of a Generic extension header.

FIG. 9 shows a specific configuration of a Generic extension header.

In FIG. 9, when "0" is set as a header mode (HM) in a single packet mode in which "0" is set as the packet setting information (PC), 11-bit length information (Length) is arranged subsequent to the header mode. A length of the payload of the Generic packet is set as the length information. On the other hand, when "1" is set as the header mode, a long-packet extension header (Additional header) is arranged subsequent to the 11-bit length information (Length).

This extension header, also including 5-bit length information, becomes a total of 16-bit length information, and a 1-bit reserved area (Res), a 1-bit sub-stream identifier flag (SIF: Sub-stream Identifier Flag), and a 1-bit optional extension header flag (OHF: Optional Header Extension Flag) are also arranged therein.

Specifically, when "0" is set as the header mode, since the length information (Length (LSB)) is 11 bits, the length of the payload of the Generic packet takes a value within the range of 0 to 2047 ($=2^{11}-1$) bytes. However, the 11-bit length information cannot express the length of the payload of 2048 bytes or more. In this regard, when data of 2048 bytes or more is to be arranged in the payload, "1" is set as the header mode so as to add 1 byte to the Generic header area. As a result, the length of the payload of 2048 bytes or more can be expressed.

Further, when "1" is set as the sub-stream identifier flag, a 1-byte SID (Sub-stream Identifier) is arranged. Furthermore, when "1" is set as the optional extension header flag, an optional header (Optional header) is arranged.

Figures 10, 11:
FIG. 10 A diagram showing a structure arranged in an optional header.
FIG. 11 A diagram showing an example of a service type.

In the optional header, a structure shown in FIG. 10 can be arranged. In the structure shown in FIG. 10, various types of information are arranged for each extension header index information (Additional header Index). For example, when "000000" is set as the extension header index information, it can be defined that service type information (service_type) is arranged in the optional header as the transport protocol selection information.

As shown in FIG. 11, information on a transport protocol of a service to be provided is set as the service type information.

Specifically, defining a case where ROUTE is used as "system A (System A)", a case where MMT is used as "system B (System B)", and a case where MPEG2-TS is used as "system C (System C)" as the transport protocol, when data of the system A is arranged in the payload, "0x00" is set as the service type information.

Further, when data of the system B is arranged in the payload, "0x01" is set as the service type information. Furthermore, when data of the system C is arranged in the payload, "0x02" is set as the service type information. It should be noted that assuming a case where other transport protocols excluding ROUTE, MMT, and MPEG2-TS are used is defined as "system D (System D)", when data of the system D is arranged in the payload, "0x03" is set as the service type information. Further, the pieces of service type information "0x04" to "0xff" are undefined (Reserved) in FIG. 11.

It should be noted that unlike the type information shown in FIG. 5, the service type information shown in FIG. 11 differentiates only the system and not data such as an IP packet and signaling information. This is because the type information (FIG. 8) arranged at the head of the Generic packet can be used to identify the data such as an IP packet and signaling information.

Referring back to FIG. 9, also in the segmentation mode or the concatenation mode in which "1" is set as the packet setting information (PC), when "1" is set as the optional extension header flag (OHF) as in the single packet mode (long packet), the structure constituted of the extension header index information and the service type information (FIG. 10) is arranged in the optional header.

As described above, by arranging the transport protocol selection information (service type information) in (the optional header of) the Generic extension header and transmitting it using the Generic extension header transmission method, as the transmission format for transmitting transport protocol selection information, the reception apparatus 20 can select (discriminate) a transport protocol to be used in a service to be provided from the plurality of transport protocols such as ROUTE and MMT.

(3) Operation Example 3

Next, with reference to FIGS. 12 to 14, an operation example 3 that uses the L2 signaling header transmission method will be described. In the L2 signaling header transmission method, the transport protocol selection information is transmitted using a header of L2 signaling (L2 signaling header).

Figure 12:
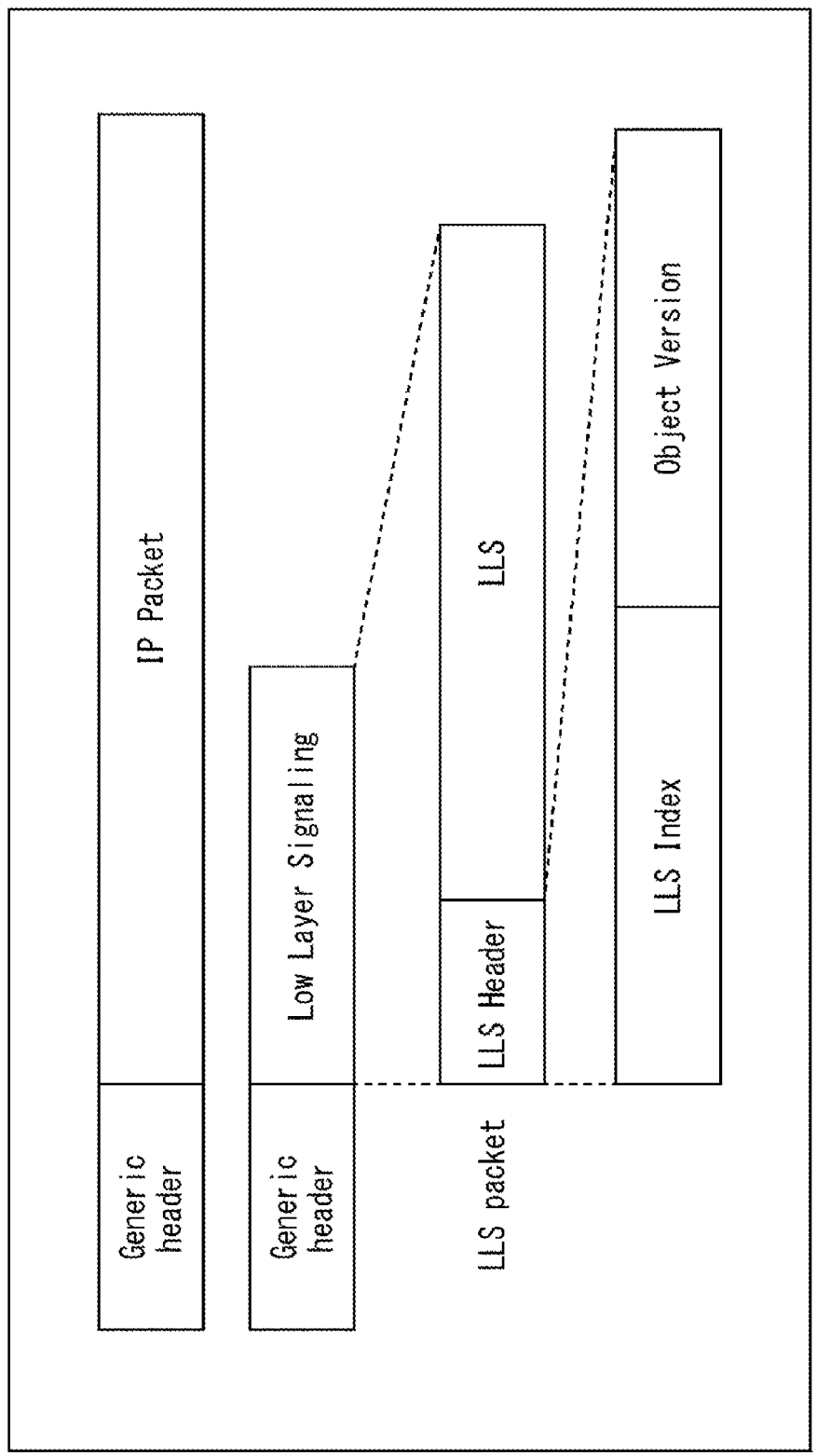
FIG. 12 A diagram showing a configuration of an LLS packet.

FIG. 12 shows a configuration of an LLS (Low Layer Signaling) packet.

In FIG. 12, an IP packet and L2 signaling information are arranged in the payload of the Generic packet, and LLS signaling information can be arranged as the L2 signaling information. The LLS signaling information is low-layer signaling information that does not depend on a service.

Included as the LLS signaling information are metadata such as FIT (Fast Information Table), SCD (Service Configuration Description), EAD (Emergency Alerting Description), RRD (Region Rating Description), and DCD (Default Component Description). FIT includes information indicating a stream or service configuration in a broadcasting network, such as information requisite for selecting a service. SCD includes information indicating a service configuration, and the like. EAD includes information on an emergency alert. RRD includes information on a rating. DCD includes minimum information for selecting a service.

When the LLS signaling information is arranged in the payload of the Generic packet, an LLS packet constituted of an LLS header and a payload is arranged. In the LLS packet, the LLS signaling information is arranged in the payload. Further, a structure constituted of LLS index information (LLS Index) and object version information (Object Version) is arranged in the LLS header.

Figure 13:
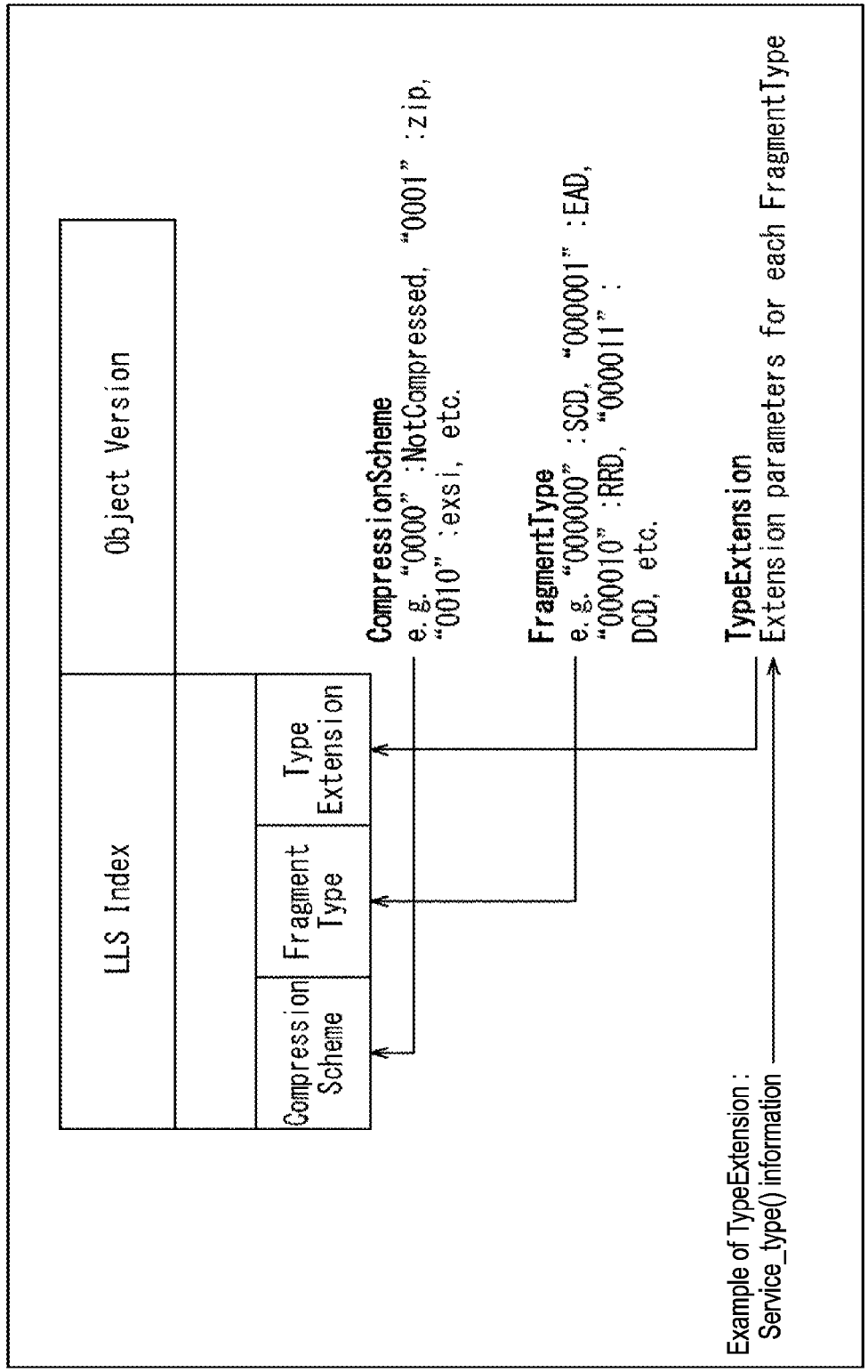
FIG. 13 A diagram showing an example of a structure arranged in an LLS header.

FIG. 13 is a diagram showing an example of the structure arranged in the LLS header shown in FIG. 12.

In FIG. 13, compression information (Compression Scheme), type information (Fragment Type), and extension type information (Type Extension) are arranged in the LLS index information. Information indicating whether target LLS signaling information is compressed is set as the compression information. For example, "0000" means that the target LLS signaling information is uncompressed, and "0001" means that the LLS signaling information is compressed in a zip format.

Information on a type of LLS signaling information is set as the type information (Fragment Type). For example, "000000", "000001", "000010", and "000011" are respectively set for SCD, EAD, RRD, and DCD. It should be noted that although not shown in the figure, type information can also be set for FIT.

As the extension type information, an extension parameter is set for each type. For example, service type information (service_type) can be arranged as the extension type information. Information on a transport protocol of a service to be provided is set as the service type information as shown in FIG. 14.

Specifically, when the transport protocol of a service to be provided is the system A (ROUTE), "0x00" is set as the service type information. Similarly, as the service type information, "0x01" is set in the case of the system B (MMT), and "0x02" is set in the case of the system C (MPEG2-TS). It should be noted that in FIG. 14, the reason why only the systems are differentiated from one another is similar to that described above with reference to FIG. 11.

As described above, by arranging the transport protocol selection information (service type information) in the L2 signaling header (extension type information of LLS header) and transmitting it using the L2 signaling header transmission method, as the transmission format for transmitting transport protocol selection information, the reception apparatus 20 can select (discriminate) a transport protocol to be used in a service to be provided from the plurality of transport protocols such as ROUTE and MMT.

(4) Operation Example 4

Next, with reference to FIGS. 15 to 17, an operation example 4 that uses the L2 signaling transmission method will be described. In the L2 signaling transmission method, the transport protocol selection information is transmitted using an L2 signaling body.

Figures 14, 15:
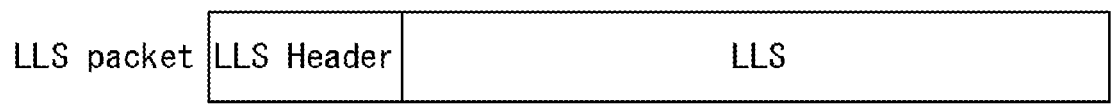
FIG. 14 A diagram showing examples of a service type.
FIG. 15 A diagram showing a configuration of an LLS packet.

FIG. 15 shows a configuration of an LLS packet.

The LLS packet is constituted of an LLS header and a payload. While LLS signaling information is arranged in the payload of the LLS packet, service type information can be incorporated into this LLS signaling information body. Here, the service type information is arranged in FIT.

FIG. 16 is a diagram showing an example of a binary-type FIT syntax.

Protocol version information is set as 8-bit FIT_protocol_version. A broadcast stream ID is set as 16-bit Broadcast_stream_id.

1-bit SCD exist flag is an SCD flag that indicates whether SCD is transmitted. When the SCD flag indicates that there is SCD in an area subsequent to the 7-bit reserved area, a PLP ID of a stream in which SCD is transmitted is set as 8-bit PLP_id. The PLP ID is an ID for identifying PLP (Physical Layer Pipe).

The number of services is set as 8-bit num_services. A service loop is repeated according to the number of services. The following content is set as the service loop.

A service ID is set as 16-bit service_id. A provider ID is set as 16-bit provider_id. Version information of SLS signaling information, which is signaling information in a service unit, is set as 8-bit SLS_data_version. A channel number of the service is set as 16-bit service_channel_number. A service category is set as 5-bit service_category.

A short service name length is set as 3-bit short_service_name_length. A short service name is set as 16*m-bit short_service_name. Service status information indicating whether a service is being provided is set as 3-bit service_status. Encryption information indicating a service protection is set as 1-bit sp_indicator.

A flag indicating an IP packet version is set as 1-bit IP-version_flag. A flag indicating whether there is an IP address of an IP packet transmission source (source) is set as 1-bit SLS_src_IP_addr_flag. A flag indicating whether there is a capability code is set as 1-bit capability_flag.

8-bit service_type is arranged subsequent to the 1-bit reserved area (reserved). Service type information is set as service_type. As shown in FIG. 17, information on a transport protocol of a service to be provided is set as the service type information.

Specifically, when the transport protocol of a service to be provided is the system A (ROUTE), "0x00" is set as the service type information. Similarly, as the service type information, "0x01" is set in the case of the system B (MMT), and "0x02" is set in the case of the system C (MPEG2-TS). It should be noted that in FIG. 17, the reason why only the systems are differentiated from one another is similar to that described above with reference to FIG. 11.

Referring back to FIG. 16, when capability_flag indicates that there is a capability code, an 8-bit capability code is set. Further, when SLS_src_IP_addr_flag indicates that there is an IP address, a transmission source (source) IP address is set as 32-bit or 128-bit SLS_dst_IP_addr.

A destination IP address is set as 32-bit or 128-bit SLS_dst_IP_addr. A port number is set as 16-bit SLS_dst_port. TSI (Transport Session Identifier) is set as 16-bit SLS_TSI. A PLP ID is set as 8-bit SLS_PLP_id.

SLS bootstrap information is formed by the PLP ID, IP address, port number, and TSI for acquiring the SLS signaling information.

1-bit SLS_simpleservice indicates which of a basic service and a rich service the target service is.

4-bit num_service_level_descriptor is arranged subsequent to a 3-bit reserved area (reserved). The number of service level descriptors is set as num_service_level_descriptor. The service level descriptor loop is repeated according to the number of service level descriptors. A service level descriptor (service_level_descriptor) is arranged in the service level descriptor loop.

A 4-bit reserved area (reserved) is arranged subsequent to the service loop. 4-bit num_FIT_level_descriptor is arranged subsequent to the reserved area. num_FIT_level_descriptor designates the number of FIT level descriptors. The FIT level descriptor loop is repeated according to the number of FIT level descriptors. A FIT level descriptor (FIT_level_descriptor) is arranged in the FIT level descriptor loop.

As described above, by arranging the transport protocol selection information (service type information) in the L2 signaling body (e.g., FIT as LLS signaling information) and transmitting it using the L2 signaling transmission method, as the transmission format for transmitting transport protocol selection information, the reception apparatus 20 can select (discriminate) a transport protocol to be used in a service to be provided from the plurality of transport protocols such as ROUTE and MMT.

(5) Operation Example 5

Finally, with reference to FIGS. 18 to 22, an operation example 5 that uses the L1 extension header transmission method will be described. In the L1 extension header transmission method, the transport protocol selection information is transmitted using an extension header (L1 extension header) of a BB frame header of a BB frame (Baseband Frame) as a physical frame of the layer 1.

Figure 18:
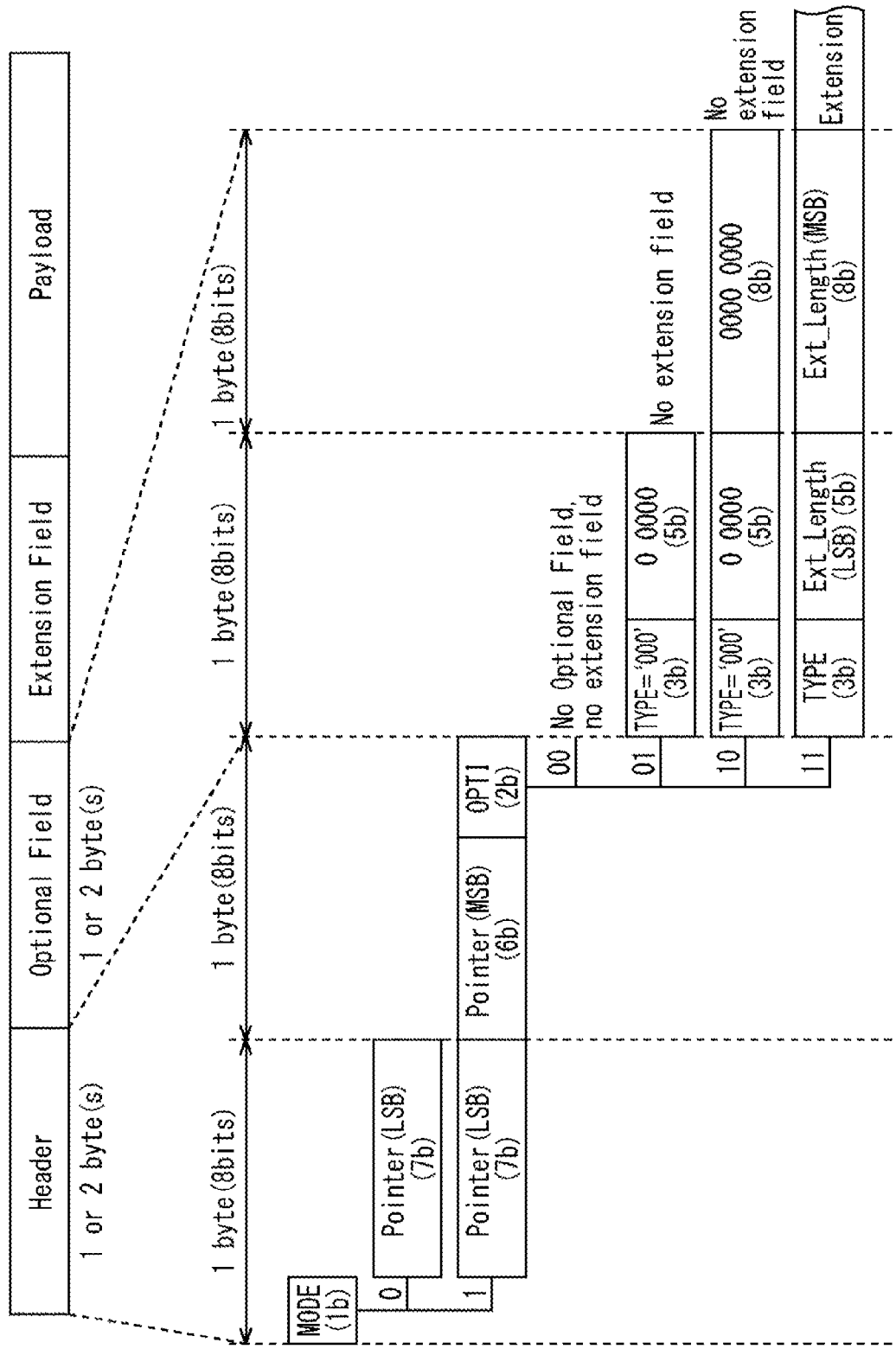
FIG. 18 A diagram showing a configuration of a BB frame.

FIG. 18 shows a configuration of a BB frame. In FIG. 18, the BB frame is constituted of a BB frame header and a payload (Payload). In addition to a 1- or 2-byte header (Header), an optional field (Optional Field) and an extension field (Extension Field) are arranged in the BB frame header.

Specifically, when "0" is set as the 1-bit mode (Mode) in the header (Header), 7-bit pointer information (Pointer (LSB)) is arranged. It should be noted that the pointer information is information that indicates a position of a Generic packet arranged in the payload of the BB frame. For example, when data of a Generic packet arranged lastly in a certain BB frame is arranged over the next BB frame, position information of a Generic packet arranged at the head of the next BB frame can be set as the pointer information.

Further, when "1" is set as the mode (Mode), 7-bit pointer information (Pointer (LSB)), 6-bit pointer information (Pointer (MSB)), and 2-bit optional flag (OPTI: OPTIONAL) are arranged. The optional flag in which the optional field (Optional Field) and the extension field (Extension Field) are arranged is information indicating whether the header is to be extended.

Figure 19:
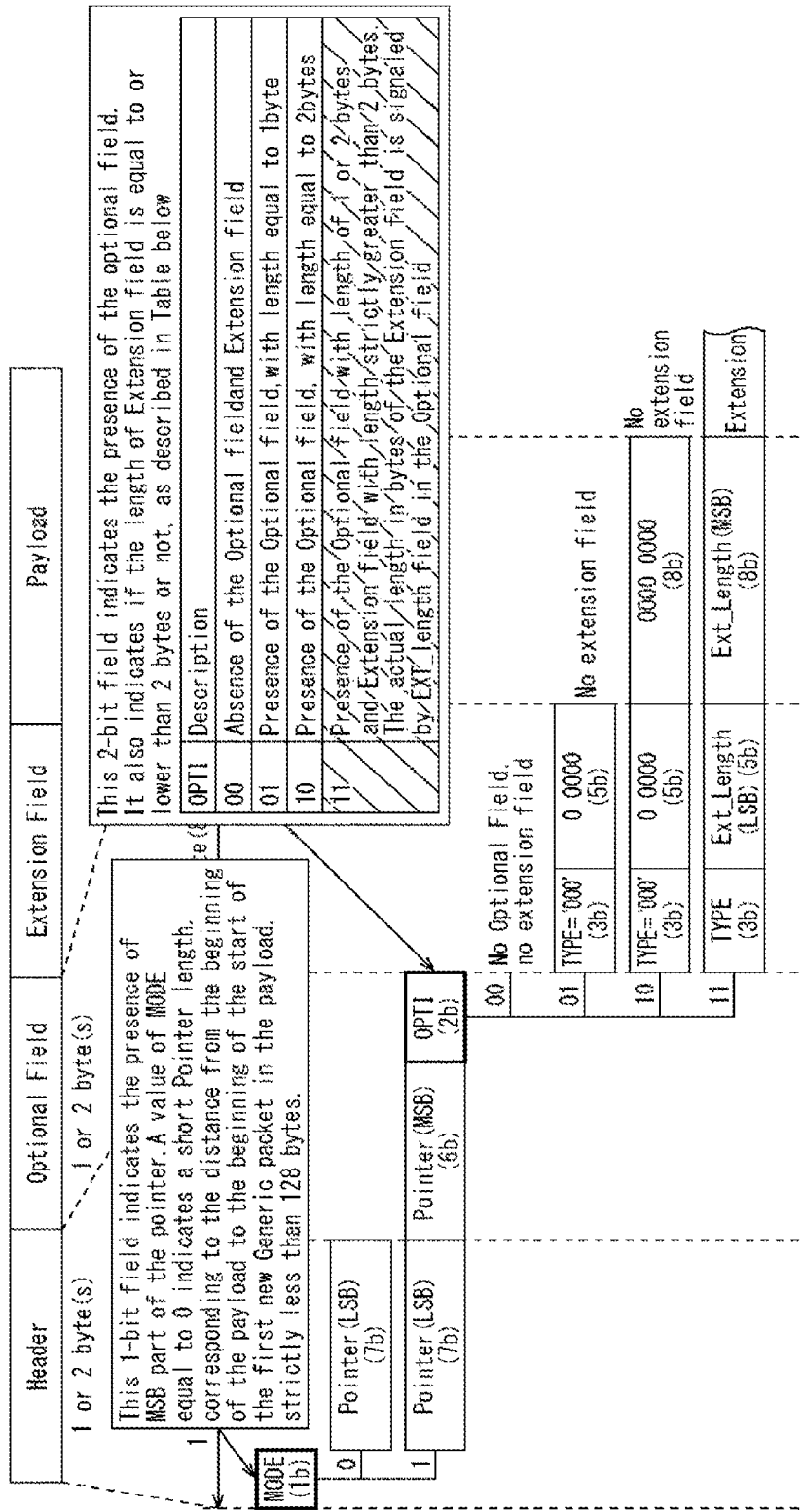
FIG. 19 A diagram for explaining a specific configuration of an extension header in an L1 extension header transmission method.

Specifically, as shown in FIG. 19, when not extending the optional field and the extension field, "00" is set as the optional flag. Further, when extending only the optional field, "01" or "10" is set as the optional flag. It should be noted that when "01" is set as the optional flag, 1-byte (8-bit) padding is performed on the optional field. Furthermore, when "10" is set as the optional flag, 2-byte (16-bit) padding is performed on the optional field.

Figure 20:
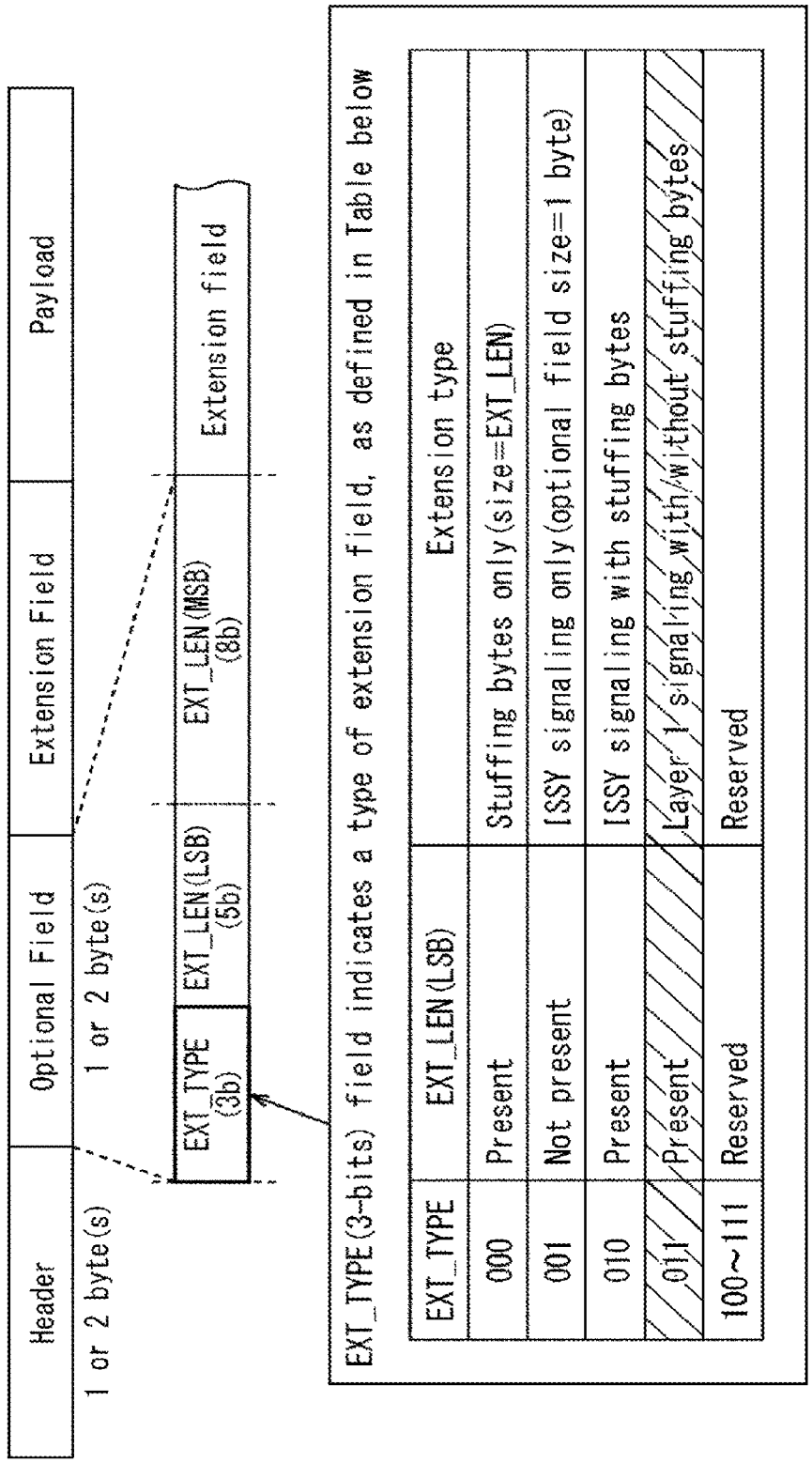
FIG. 20 A diagram for explaining a specific configuration of the extension header in the L1 extension header transmission method.

Further, when extending the optional field and the extension field, "11" is set as the optional flag. In this case, 3-bit extension type information (TYPE (EXT_TYPE)) is set at the head of the optional field. As shown in FIG. 20, information on the extension length information (EXT_Length (LSB)) and extension field type (Extension type) that are arranged subsequent to the extension type information is set in this type information.

Specifically, when the extension length information is arranged and only stuffing bytes (Stuffing Bytes) are to be arranged, "00" is set as the extension type information. Further, when the extension length information is not arranged and ISSY (Input Stream Synchronizer) is arranged in the extension field, "001" is set as the extension type information. Furthermore, when the extension length information is arranged and stuffing bytes are arranged in the extension field together with ISSY, "010" is set as the extension type information.

Further, when the extension length information is arranged and L1 signaling information is arranged in the extension field, "011" is set as the extension type information. In this case, whether to arrange the stuffing bytes is arbitrary. It should be noted that in FIG. 20, pieces of extension type information "100" to "111" are undefined (Reserved).

In addition, in the L1 extension header transmission method, the transport protocol selection information is arranged as L1 signaling information of the extension field (L1 extension header). Specifically, when the L1 extension header transmission method is used, "11" is set as the optional flag (OPTI), the optional field and the extension field are extended, "011" is set as the optional field extension type information (EXT_TYPE), and L1 signaling information including the transport protocol selection information is arranged in the extension field.

A structure shown in FIG. 21 can be arranged in the extension field. In the structure shown in FIG. 21, various types of information are arranged for each extension header index information (BBF Extension Header Index). When "000000" is set as the extension header index information, it can be defined that service type information (service_type) is arranged in the extension field as the transport protocol selection information.

As shown in FIG. 22, information on a transport protocol of a service to be provided is set as the service type information.

Specifically, when the transport protocol of a service to be provided is the system A (ROUTE), "0x00" is set as the service type information. Similarly, as the service type information, "0x01" is set in the case of the system B (MMT), and "0x02" is set in the case of the system C (MPEG2-TS).

As described above, by arranging the transport protocol selection information (service type information) in the extension header of a BB frame header of a BB frame (extension field of L1 extension header) and transmitting it using the L1 extension header transmission method, as the transmission format for transmitting transport protocol selection information, the reception apparatus 20 can select (discriminate) a transport protocol to be used in a service to be provided from the plurality of transport protocols such as ROUTE and MMT.

4. Configuration of Each Apparatus

Next, specific configurations of the transmission apparatus 10 and the reception apparatus 20 constituting the transmission system shown in FIG. 1 will be described.

(Configuration of Transmission Apparatus)

Figure 23:
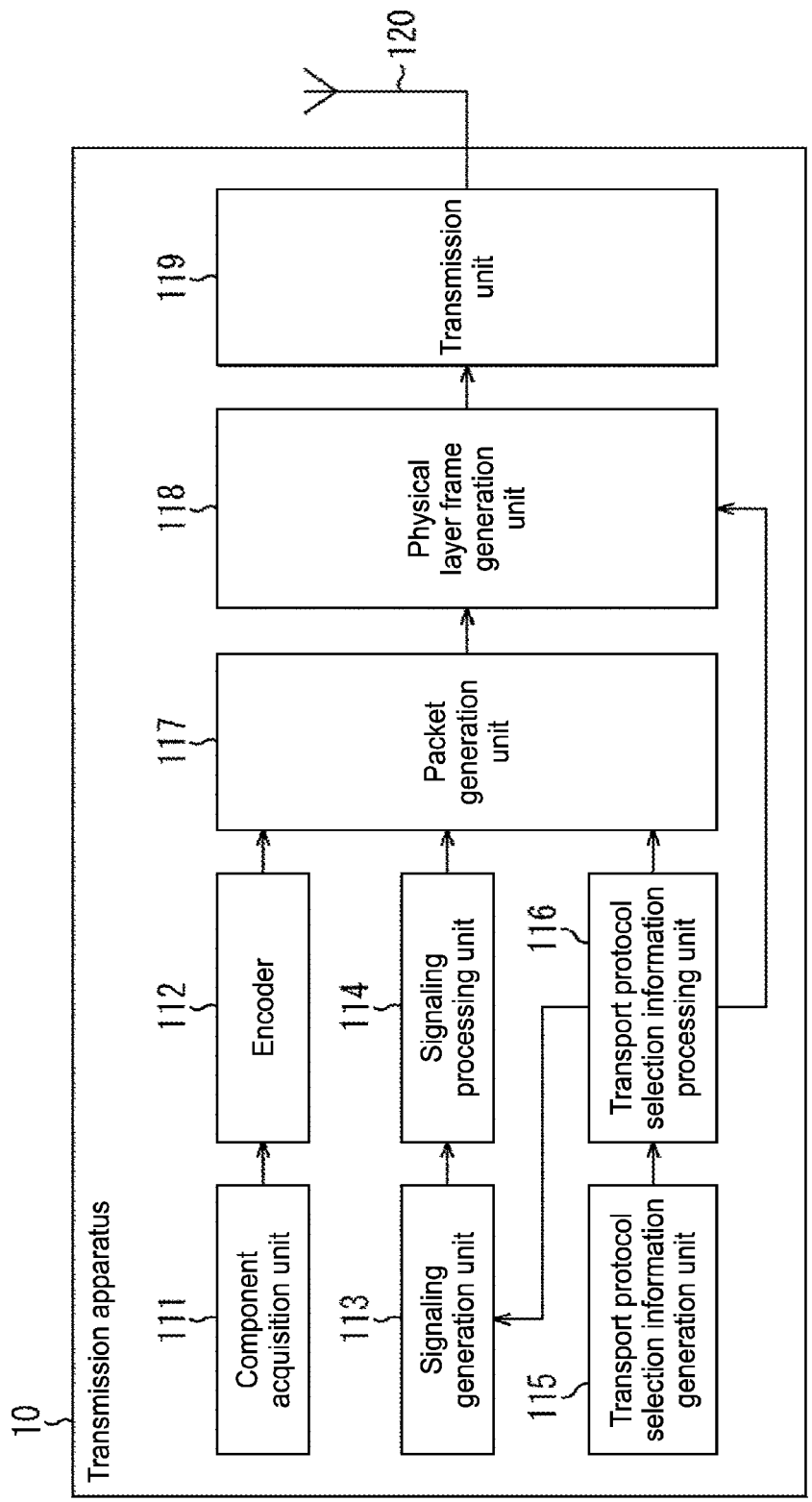
FIG. 23 A diagram showing a configuration example of a transmission apparatus.

FIG. 23 is a diagram showing a configuration example of the transmission apparatus 10.

In FIG. 23, the transmission apparatus 10 is constituted of a component acquisition unit 111, an encoder 112, a signaling generation unit 113, a signaling processing unit 114, a transport protocol selection information generation unit 115, a transport protocol selection information processing unit 116, a packet generation unit 117, a physical layer frame generation unit 118, and a transmission unit 119.

The component acquisition unit 111 acquires video and audio data as components constituting a content provided by a specific service (e.g., television program) and supplies the data to the encoder 112. The encoder 112 encodes the video and audio data supplied from the component acquisition unit 111 by a predetermined encoding method and supplies the encoded data to the packet generation unit 117.

It should be noted that as the content, for example, a relevant content is acquired from a storage area for already-recorded contents based on a broadcast time slot or a live content is acquired from a studio or a location.

The signaling generation unit 113 acquires raw data for generating signaling information from an external server, a built-in storage, or the like. Using the raw data of signaling information, the signaling generation unit 113 generates signaling information and supplies it to the signaling processing unit 114. Here, LLS signaling information and SLS signaling information are generated as the signaling information.

The transport protocol selection information generation unit 115 acquires raw data for generating transport protocol selection information from an external server, a built-in storage, or the like. Using the raw data of transport protocol selection information, the transport protocol selection information generation unit 115 generates transport protocol selection information and supplies it to the transport protocol selection information processing unit 116.

The transport protocol selection information processing unit 116 processes the transport protocol selection information supplied from the transport protocol selection information generation unit 115 and supplies it to the signaling generation unit 113, the packet generation unit 117, and the physical layer frame generation unit 118.

Specifically, when using the Generic header transmission method, the Generic extension header transmission method, or the L2 signaling header transmission method, the transport protocol selection information is arranged in the Generic header, the Generic extension header, or the L2 signaling header (LLS header). Therefore, the transport protocol selection information is supplied to the packet generation unit 117 that generates packets to which those headers are added.

Further, when using the L2 signaling transmission method, the transport protocol selection information is arranged in the L2 signaling (LLS signaling body). Therefore, the transport protocol selection information is supplied to the signaling generation unit 113 that generates L2 signaling (LLS signaling information). In this case, the signaling generation unit 113 generates L2 signaling (LLS signaling information (FIT)) using the transport protocol selection information in addition to the raw data.

Further, when using the L1 extension header transmission method, the transport protocol selection information is arranged in the L1 extension header. Therefore, the transport protocol selection information is supplied to the physical layer frame generation unit 118 that generates a physical layer frame.

The packet generation unit 117 generates an IP packet using the component data supplied from the encoder 112 and the signaling information supplied from the signaling processing unit 114. The packet generation unit 117 also generates a Generic packet by encapsulating one or a plurality of IP packets and supplies it to the physical layer frame generation unit 118.

It should be noted that when using the Generic header transmission method, the packet generation unit 117 arranges the transport protocol selection information supplied from the transport protocol selection information processing unit 116 in the Generic header of the Generic packet.

When using the Generic extension header transmission method, the packet generation unit 117 arranges the transport protocol selection information in (the optional header of) the Generic extension header of the Generic packet. When using the L2 signaling header transmission method, the packet generation unit 117 arranges the transport protocol selection information in the L2 signaling header (extension type information of LLS header of LLS packet).

The physical layer frame generation unit 118 generates a physical layer frame by encapsulating the plurality of Generic packets supplied from the packet generation unit 117 and supplies it to the transmission unit 119.

It should be noted that when using the L1 extension header transmission method, the physical layer frame generation unit 118 arranges the transport protocol selection information supplied from the transport protocol selection information processing unit 116 in the extension header (extension field of L1 extension header) of the BB frame header of the BB frame.

The transmission unit 119 carries out processing of, for example, OFDM (Orthogonal Frequency Division Multiplexing) digital modulation, on the physical layer frame supplied from the physical layer frame generation unit 118 and transmits the processed frame as digital broadcasting signals via an antenna 120.

It should be noted that in the transmission apparatus 10 shown in FIG. 23, all the functional blocks do not need to be physically arranged in a single apparatus, and at least a part of the functional blocks may be structured as an apparatus physically independent from the other functional blocks.

(Configuration of Reception Apparatus)

Figure 24:
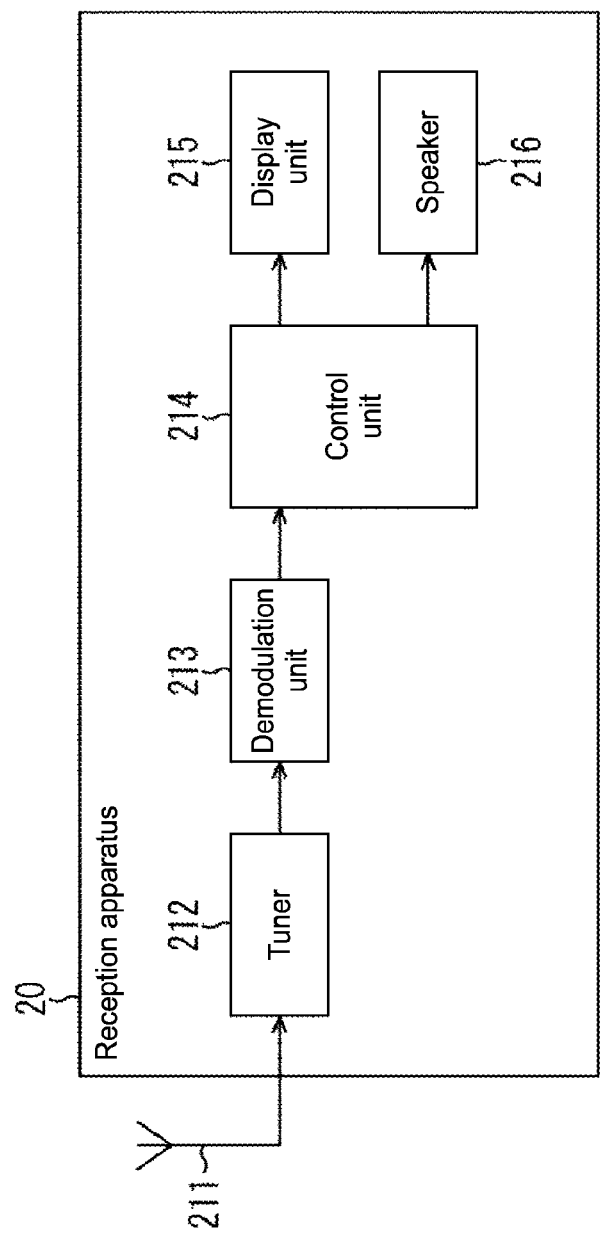
FIG. 24 A diagram showing a configuration example of a reception apparatus.

FIG. 24 is a diagram showing a configuration example of the reception apparatus 20 shown in FIG. 1.

In FIG. 24, the reception apparatus 20 is constituted of a tuner 212, a demodulation unit 213, a control unit 214, a display unit 215, and a speaker 216.

The tuner 212 syntonizes components of a predetermined frequency channel from digital broadcasting signals received via an antenna 211. The demodulation unit 213 carries out demodulation processing on the digital broadcasting signals syntonized by the tuner 212. In the demodulation processing, for example, demodulation processing on a physical layer frame received as digital broadcasting signals is carried out using physical layer modulation information.

The control unit 214 carries out processing on the signals supplied from the demodulation unit 213. For example, the control unit 214 carries out decoding processing on a stream of the components acquired from the signals from the demodulation unit 213 by a predetermined decoding method and causes the display unit 215 to display a video of a content provided by the selected service (e.g., television program) based on the video and audio data obtained resultantly, and also causes the speaker 216 to output audio.

It should be noted that the control unit 214 is structured as a system-on-chip (SoC: System On Chip), for example.

Here, in the demodulation unit 213, the transport protocol selection information is acquired (extracted) from headers of a physical layer frame or a Generic packet and the like and supplied to the control unit 214. The control unit 214 processes the signaling information or the stream of components according to the system (e.g., ROUTE or MMT) set in the transport protocol selection information from the demodulation unit 213, to thus reproduce video and audio of a content.

Specifically, when using the Generic header transmission method, the control unit 214 processes the signaling information or the stream of components according to the system (e.g., ROUTE or MMT) set in the transport protocol selection information obtained from a Generic header of a Generic packet.

Similarly, the transport protocol selection information is acquired (extracted) from (an optional header of) a Generic extension header of a Generic packet when the Generic extension header transmission method is used, and the transport protocol selection information is acquired (extracted) from an L2 signaling header (extension type information of LLS header of LLS packet) when the L2 signaling header transmission method is used. Moreover, the transport protocol selection information is acquired (extracted) from L2 signaling (LLS signaling information (FIT)) when the L2 signaling transmission method is used, and the transport protocol selection information is acquired (extracted) from an extension header (extension field of L1 extension header) of a BB frame header of a BB frame when the L1 extension header transmission method is used.

Then, the control unit 214 processes the signaling information or the stream of components according to the system (e.g., ROUTE or MMT) set in the transport protocol selection information transmitted by any of the transmission methods.

It should be noted that although the demodulation unit 213 acquires (extracts) the transport protocol selection information from headers of a physical layer frame or a Generic packet and the like in FIG. 24, it is also possible for the control unit 214 to acquire (extract) the transport protocol selection information from the header of a Generic packet, L2 signaling, and the like.

Moreover, while the display unit 215 and the speaker 216 are incorporated in the reception apparatus 20 shown in FIG. 24, the display unit 215 and the speaker 216 may be provided outside.

5. Flow of Processing Executed in Each Apparatus

Figure 25:
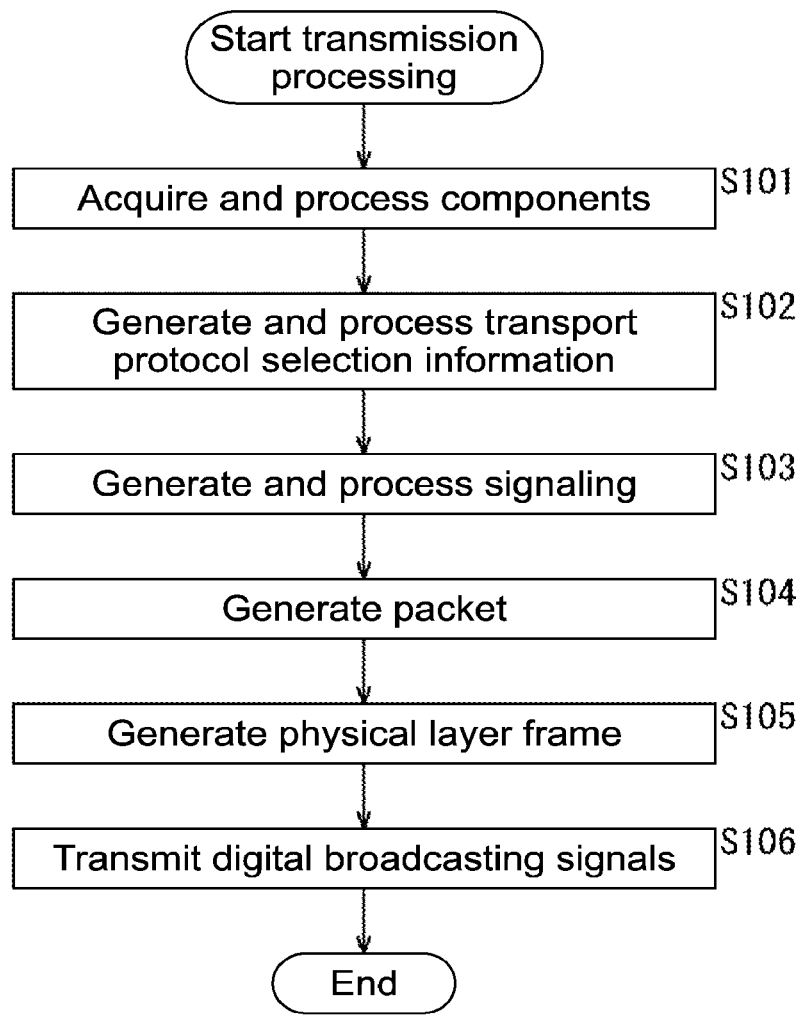
FIG. 25 A flowchart for explaining transmission processing.

Next, with reference to the flowchart of FIGS. 25 and 26, flows of processing executed in the respective apparatuses constituting the transmission system 1 shown in FIG. 1 will be described.

(Transmission Processing)

First, with reference to the flowchart of FIG. 25, transmission processing executed by the transmission apparatus 10 shown in FIG. 1 will be described.

In Step S101, the component acquisition unit 111 acquires video and audio data as components constituting a content. Further, in Step S101, the encoder 112 encodes the video and audio data acquired by the component acquisition unit 111 by a predetermined encoding method.

In Step S102, the transport protocol selection information generation unit 115 generates transport protocol selection information using raw data of transport protocol selection information. Also in Step S102, the transport protocol selection information processing unit 116 processes the transport protocol selection information generated by the transport protocol selection information generation unit 115.

In Step S103, the signaling generation unit 113 generates signaling information using raw data of signaling information. Also in Step S103, the signaling processing unit 114 processes the signaling information generated by the signaling generation unit 113.

It should be noted that when the L2 signaling transmission method is used, the signaling generation unit 113 generates L2 signaling (LLS signaling information (FIT)) using the transport protocol selection information generated by the processing of Step S102 in addition to the raw data.

In Step S104, the packet generation unit 117 generates an IP packet using the component data processed in Step S101 and the signaling information processed in Step S103. Further, the packet generation unit 117 generates a Generic packet by encapsulating one or a plurality of IP packets.

It should be noted that when the Generic header transmission method is used, the packet generation unit 117 arranges the transport protocol selection information generated by the processing of Step S102 in the Generic header of the Generic packet. Similarly, when the Generic extension header transmission method is used, the packet generation unit 117 arranges the transport protocol selection information in (the optional header of) the Generic extension header of the Generic packet. Moreover, when the L2 signaling header transmission method is used, the packet generation unit 117 arranges the transport protocol selection information in the L2 signaling header (extension type information of LLS header of LLS packet).

In Step S105, the physical layer frame generation unit 118 generates a physical layer frame by encapsulating the plurality of Generic packets generated by the processing of Step S104.

It should be noted that when the L1 extension header transmission method is used, the physical layer frame generation unit 118 arranges the transport protocol selection information generated by the processing of Step S102 in the extension header (extension field of L1 extension header) of the BB frame header of the BB frame.

In Step S106, the transmission unit 119 carries out predetermined processing on the physical layer frame generated by the processing of Step S105 and transmits it as digital broadcasting signals via the antenna 120. When the processing of Step S106 is ended, the transmission processing shown in FIG. 25 ends.

Heretofore, the transmission processing has been described. In the transmission processing, transport protocol selection information used for selecting a transport protocol to be used in a specific service from a plurality of transport protocols defined by a broadcasting system such as ATSC3.0 is generated, and a content provided by the specific service is transmitted according to the transport protocol set in the transport protocol selection information together with the transport protocol selection information. As a result, it becomes possible to select a transport protocol for each service and enable the plurality of transport protocols to coexist.

(Reception Processing)

Next, with reference to the flowchart of FIG. 26, reception processing executed by the reception apparatus 20 shown in FIG. 1 will be described.

In Step S201, the tuner 212 syntonizes components of a predetermined frequency channel from digital broadcasting signals received via the antenna 211. In other words, the reception apparatus 20 receives the digital broadcasting signals from the transmission apparatus 10.

In Step S202, the demodulation unit 213 carries out demodulation processing on the digital broadcasting signals syntonized by the tuner 212. For example, the demodulation processing is carried out on a physical layer frame received as the digital broadcasting signals using physical layer modulation information. The demodulation unit 213 also acquires (extracts) transport protocol selection information from headers of a physical layer frame or a Generic packet and the like and supplies it to the control unit 214.

Specifically, when the Generic header transmission method is used, the transport protocol selection information is acquired (extracted) from a Generic header of a Generic packet.

Similarly, the transport protocol selection information is acquired (extracted) from (an optional header of) a Generic extension header of a Generic packet when the Generic extension header transmission method is used, and the transport protocol selection information is acquired (extracted) from an L2 signaling header (extension type information of LLS header of LLS packet) when the L2 signaling header transmission method is used. Moreover, the transport protocol selection information is acquired (extracted) from L2 signaling (LLS signaling information (FIT)) when the L2 signaling transmission method is used, and the transport protocol selection information is acquired (extracted) from an extension header (extension field of L1 extension header) of a BB frame header of a BB frame when the L1 extension header transmission method is used.

In Step S203, the control unit 214 processes the signaling information or the stream of components according to the system (e.g., ROUTE or MMT) set in the transport protocol selection information acquired (extracted) by the processing of Step S202. As a result, the control unit 214 can cause the display unit 215 to display a video of a content and cause the speaker 216 to output audio of the content based on the video and audio data.

Figure 26:
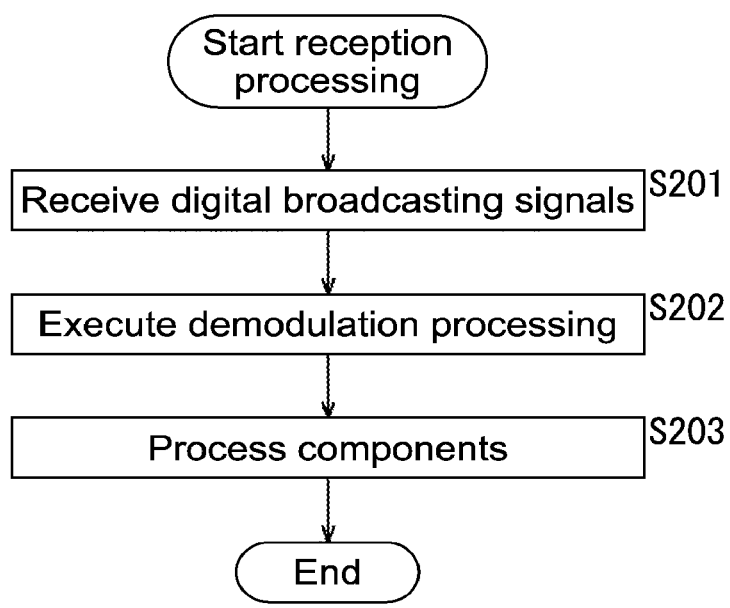
FIG. 26 A flowchart for explaining reception processing.

When the processing of Step S203 is ended, the reception processing shown in FIG. 26 ends.

Heretofore, the reception processing has been described. In the reception processing, together with transport protocol selection information used for selecting a transport protocol to be used in a specific service from a plurality of transport protocols defined by a broadcasting system such as ATSC3.0, a content provided by the specific service is received according to the transport protocol set in the transport protocol selection information, and processing of reproducing the content is carried out according to the transport protocol set in the transport protocol selection information. As a result, it becomes possible to select a transport protocol for each service and enable the plurality of transport protocols to coexist.

6. Computer Configuration

Figure 27:
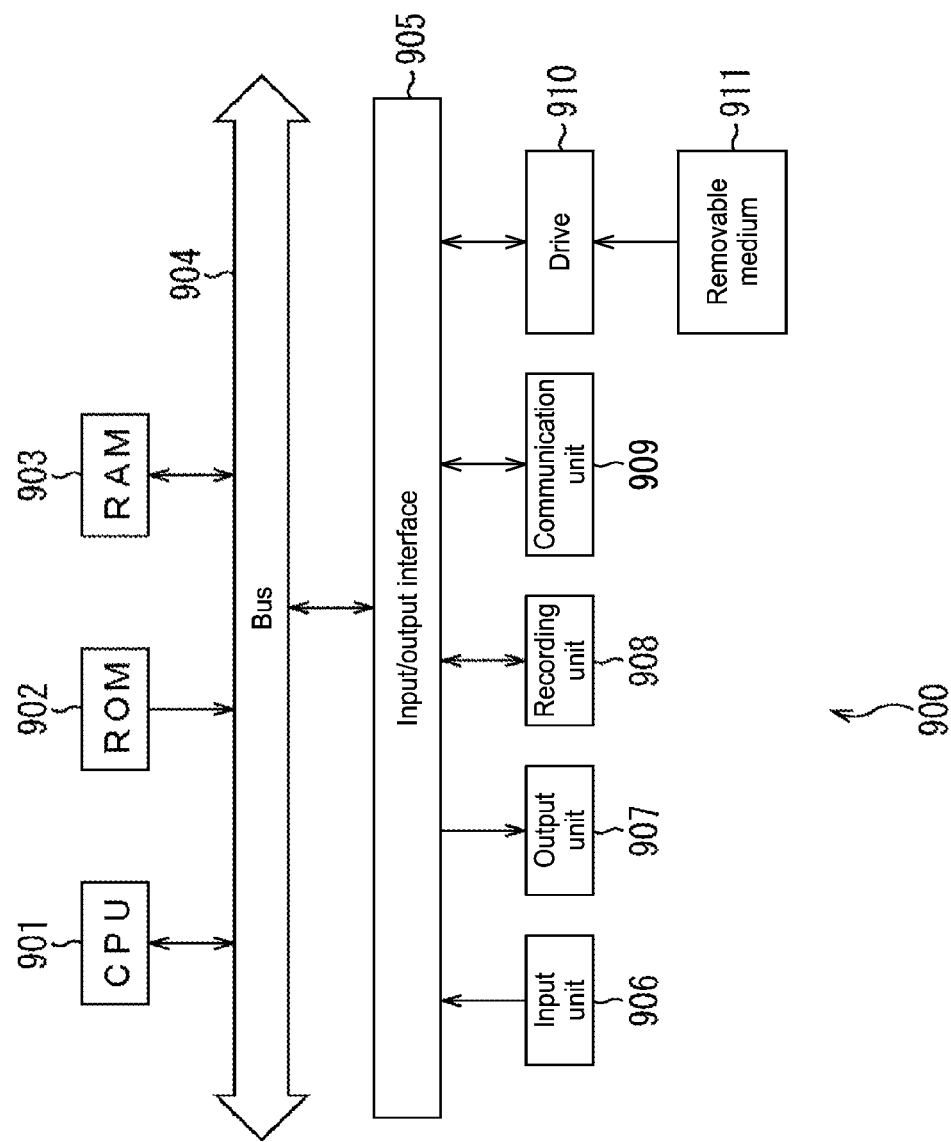
FIG. 27 A diagram showing a configuration example of a computer.

The above-mentioned series of processing may be executed by hardware or may be executed by software. If the series of processing is executed by software, programs configuring that software are installed into a computer. FIG. 27 is a diagram showing a configuration example of hardware of a computer that executes the above-mentioned series of processing according to the programs.

In a computer 900, a CPU (Central Processing Unit) 901, a ROM (Read Only Memory) 902, and a RAM (Random Access Memory) 903 are connected to one another via a bus 904. An input/output interface 905 is further connected to the bus 904. An input unit 906, an output unit 907, a recording unit 908, a communication unit 909, and a drive 910 are connected to the input/output interface 905.

The input unit 906 is constituted of a keyboard, a mouse, a microphone, and the like. The output unit 907 is constituted of a display, a speaker, and the like. The recording unit 908 is constituted of a hard disk, a nonvolatile memory, and the like. The communication unit 909 is constituted of a network interface and the like. The drive 910 drives a removable medium 911 such as a magnetic disk, an optical disc, a magneto-optical disk, and a semiconductor memory.

In the thus configured computer 900, the above-mentioned series of processing is performed by the CPU 901 loading programs stored in the ROM 902 and the recording unit 908 into the RAM 903 via the input/output interface 905 and the bus 904 and executing them.

The programs executed by the computer 900 (CPU 901) can be recorded and provided on the removable medium 911 as a package medium, for example. Further, the programs can be provided via a wired or wireless transmission medium such as a local-area network, the Internet, and digital satellite broadcasting.

In the computer 900, the programs can be installed into the recording unit 908 via the input/output interface 905 by the removable medium 911 being mounted on the drive 910. Further, the programs can be received by the communication unit 909 via the wired or wireless transmission medium and installed into the recording unit 908. Otherwise, the programs can be installed into the ROM 902 or the recording unit 908 in advance.

In the present specification, the processing executed by the computer according to the programs does not necessarily need to be performed in a time sequence in the order described as the flowchart. That is, the processing executed by the computer according to the programs includes processes executed in parallel or individually (e.g., parallel processing or processing by objects). Further, the programs may be processed by a single computer (processor) or may be processed by a plurality of computers in a distributed manner.

Note that embodiments of the present technology are not limited to the above-mentioned embodiments and various modifications can be made without departing from the gist of the present technology.

Furthermore, the present technology may also take the following configurations.

(1) A transmission apparatus, including:
a generation unit that generates transport protocol selection information used for selecting a transport protocol to be used in a specific service from a plurality of transport protocols conforming to a predetermined standard; and
a transmission unit that transmits, together with the transport protocol selection information, a content provided by the specific service according to the transport protocol set in the transport protocol selection information.

(2) The transmission apparatus according to (1),
in which the transport protocol selection information is in a header of a transmission packet that transmits an IP (Internet Protocol) packet.

(3) The transmission apparatus according to (1),
in which the transport protocol selection information is arranged in an extension header of a transmission packet that transmits an IP packet.

(4) The transmission apparatus according to (1),
in which the transport protocol selection information is arranged in a header added to L2 signaling information arranged in a payload of a transmission packet that transmits an IP packet.

(5) The transmission apparatus according to (1),
in which the transport protocol selection information is included in L2 signaling information arranged in a payload of a transmission packet that transmits an IP packet.

(6) The transmission apparatus according to (1),
in which the transport protocol selection information is arranged in an extension header of a BB (Baseband) frame.

(7) The transmission apparatus according to any one of (1) to (6), in which
the predetermined standard is ATSC (Advanced Television Systems Committee) 3.0, and
the plurality of transport protocols are ROUTE (Real-Time Object Delivery over Unidirectional Transport) and MMT (MPEG Media Transport).

(8) A transmission method for a transmission apparatus, including the steps of:
by the transmission apparatus,
generating transport protocol selection information used for selecting a transport protocol to be used in a specific service from a plurality of transport protocols conforming to a predetermined standard; and
transmitting, together with the transport protocol selection information, a content provided by the specific service according to the transport protocol set in the transport protocol selection information.

(9) A reception apparatus, including:
a reception unit that receives, together with transport protocol selection information used for selecting a transport protocol to be used in a specific service from a plurality of transport protocols conforming to a predetermined standard, a content provided by the specific service that is transmitted according to the transport protocol set in the transport protocol selection information; and a processing unit that carries out processing of reproducing the content according to the transport protocol set in the transport protocol selection information.

(10) The reception apparatus according to (9), in which the transport protocol selection information is arranged in a header of a transmission packet that transmits an IP packet.

(11) The reception apparatus according to (9), in which the transport protocol selection information is arranged in an extension header of a transmission packet that transmits an IP packet.

(12) The reception apparatus according to (9), in which the transport protocol selection information is arranged in a header added to L2 signaling information arranged in a payload of a transmission packet that transmits an IP packet.

(13) The reception apparatus according to (9), in which the transport protocol selection information is included in L2 signaling information arranged in a payload of a transmission packet that transmits an IP packet.

(14) The reception apparatus according to (9), in which the transport protocol selection information is arranged in an extension header of a BB frame.

(15) The reception apparatus according to (9), in which the predetermined standard is ATSC 3.0, and the plurality of transport protocols are ROUTE and MMT.

(16) A reception method for a reception apparatus, including the steps of:

by the reception apparatus, receiving, together with transport protocol selection information used for selecting a transport protocol to be used in a specific service from a plurality of transport protocols conforming to a predetermined standard, a content provided by the specific service that is transmitted according to the transport protocol set in the transport protocol selection information; and carrying out processing of reproducing the content according to the transport protocol set in the transport protocol selection information.

DESCRIPTION OF REFERENCE NUMERALS 1 transmission system
10 transmission apparatus
20 reception apparatus
30 transmission channel
111 component acquisition unit
113 signaling generation unit
115 transport protocol selection information generation unit
117 packet generation unit
118 physical layer frame generation unit
119 transmission unit
212 tuner
213 demodulation unit
214 control unit
215 display unit
216 speaker
900 computer
901 CPU

The invention claimed is:

1. A transmission apparatus, comprising:
circuitry configured to
generate transport protocol selection information used for indicating a transport protocol for use in a specific service from a plurality of transport protocols conforming to a standard;
transmit an information table related to a service in low layer signaling (LLS) information, the information table including a service identification (ID), a channel number, a service category, and the transport protocol selection information, the LLS information not depending on a service; and
transmit a content provided by the specific service according to the transport protocol indicated by the transport protocol selection information included in the LLS information, wherein
the plurality of transport protocols include at least Real-Time Object Delivery over Unidirectional Transport (ROUTE) and MPEG Media Transport (MMT).

2. A transmission method for a transmission apparatus, the transmission method comprising:
generating, using circuitry, transport protocol selection information used for indicating a transport protocol for use in a specific service from a plurality of transport protocols conforming to a standard;
transmitting an information table related to a service in low layer signaling (LLS) information, the information table including a service identification (ID), a channel number, a service category, and the transport protocol selection information, the LLS information not depending on a service; and
transmitting a content provided by the specific service according to the transport protocol indicated by the transport protocol selection information included in the LLS information, wherein
the plurality of transport protocols include at least Real-Time Object Delivery over Unidirectional Transport (ROUTE) and MPEG Media Transport (MMT).

3. A non-transitory computer readable medium including executable instructions, which when executed by a computer cause the computer to execute a transmission method for a transmission apparatus, the transmission method comprising:
generating transport protocol selection information used for indicating a transport protocol for use in a specific service from a plurality of transport protocols conforming to a standard;
transmitting an information table related to a service in low layer signaling (LLS) information, the information table including a service identification (ID), a channel number, a service category, and the transport protocol selection information, the LLS information not depending on a service; and
transmitting a content provided by the specific service according to the transport protocol indicated by the transport protocol selection information included in the LLS information, wherein
the plurality of transport protocols include at least Real-Time Object Delivery over Unidirectional Transport (ROUTE) and MPEG Media Transport (MMT).

4. A reception apparatus, comprising:
circuitry configured to
receive low layer signaling (LLS) information including an information table related to a service, the information table including a service identification (ID), a channel number, a service category, and transport protocol selection information, the transport protocol selection information used for indicating a transport protocol for use in a specific service from a plurality of transport protocols conforming to a standard, the LLS information not depending on a service;

receive a content provided by the specific service that is transmitted according to the transport protocol indicated by the transport protocol selection information included in the LLS information; and reproduce the content received according to the transport protocol indicated by the transport protocol selection information, wherein the plurality of transport protocols include at least Real-Time Object Delivery over Unidirectional Transport (ROUTE) and MPEG Media Transport (MMT).

5. The transmission apparatus according to claim 1, wherein the information table includes a destination IP address.

6. The transmission apparatus according to claim 1, wherein the information table includes a port number.

7. The transmission apparatus according to claim 1, wherein the information table includes a source IP address.

8. The transmission apparatus according to claim 1, wherein the information table includes information on capability.

9. The transmission method according to claim 2, wherein the information table includes a destination IP address.

10. The transmission method according to claim 2, wherein the information table includes a port number.

11. The transmission method according to claim 2, wherein the information table includes a source IP address.

12. The transmission method according to claim 2, wherein the information table includes information on capability.

13. The non-transitory computer readable medium according to claim 3, wherein the information table includes a destination IP address.

14. The non-transitory computer readable medium according to claim 3, wherein the information table includes a port number.

15. The non-transitory computer readable medium according to claim 3, wherein the information table includes a source IP address.

16. The non-transitory computer readable medium according to claim 3, wherein the information table includes information on capability.

17. The reception apparatus according to claim 4, wherein the information table includes a destination IP address.

18. The reception apparatus according to claim 4, wherein the information table includes a port number.

19. The reception apparatus according to claim 4, wherein the information table includes a source IP address.

20. The reception apparatus according to claim 4, wherein the information table includes information on capability.

21. A reception method for a reception apparatus, the reception method comprising:

receiving low layer signaling (LLS) information including an information table related to a service, the information table including a service identification (ID), a channel number, a service category, and transport protocol selection information, the transport protocol selection information used for indicating a transport protocol for use in a specific service from a plurality of transport protocols conforming to a standard, the LLS information not depending on a service;

receiving a content provided by the specific service that is transmitted according to the transport protocol indicated by the transport protocol selection information; and reproducing, by circuitry, the content received according to the transport protocol indicated by the transport protocol selection information included in the LLS information, wherein the plurality of transport protocols include at least Real-Time Object Delivery over Unidirectional Transport (ROUTE) and MPEG Media Transport (MMT).

22. The reception method according to claim 21, wherein the information table includes a destination IP address.

23. The reception method according to claim 21, wherein the information table includes a port number.

24. The reception method according to claim 21, wherein the information table includes a source IP address.

25. The reception method according to claim 21, wherein the information table includes information on capability.

* * * * *